US012789136B2

(12) United States Patent
Priske

(10) Patent No.: US 12,789,136 B2
(45) Date of Patent: Nov. 10, 2026

(54) APPARATUS AND METHOD FOR SIMULTANEOUSLY TREATING DIFFERENT FLUCTUATING GAS FLOWS

(71) Applicant: EVONIK OPERATIONS GMBH, Essen (DE)

(72) Inventor: Markus Priske, Salzburg (AT)

(73) Assignee: Evonik Operations GmbH, Essen (DE)

( * ) Notice: Subject to any disclaimer, the term of this patent is extended or adjusted under 35 U.S.C. 154(b) by 292 days.

(21) Appl. No.: 18/293,448

(22) PCT Filed: Jul. 20, 2022

(86) PCT No.: PCT/EP2022/070296

§ 371 (c)(1), (2) Date: Jan. 30, 2024

(87) PCT Pub. No.: WO2023/011919

PCT Pub. Date: Feb. 9, 2023

(65) Prior Publication Data

US 2024/0278170 A1 Aug. 22, 2024

(30) Foreign Application Priority Data

Aug. 3, 2021 (EP) .................................... 21189420

(51) Int. Cl.
*B01D 53/22* (2006.01)
*C10L 3/10* (2006.01)

(52) U.S. Cl.
CPC ......... *B01D 53/227* (2013.01); *B01D 53/228* (2013.01); *B01D 2256/245* (2013.01)

(58) Field of Classification Search
CPC ................ B01D 53/227; B01D 53/228; B01D 2256/245; B01D 53/226; B01D 53/225; B01D 53/22; C10L 3/101; C10L 2290/548
(Continued)

(56) References Cited

U.S. PATENT DOCUMENTS

| | | | |
|---|---|---|---|
| 3,422,008 | A | 1/1969 | McLain |
| 3,455,460 | A | 7/1969 | Mahon et al. |

(Continued)

FOREIGN PATENT DOCUMENTS

| | | | |
|---|---|---|---|
| CN | 205420305 | U | 8/2016 |
| EP | 0596268 | | 11/1994 |

(Continued)

OTHER PUBLICATIONS

English language translation of the International Search Report for PCT/EP2024/051850 filed, Jan. 26, 2024; corresponding to copending U.S. Appl. No. 19/150,253.

(Continued)

*Primary Examiner* — Frank M Lawrence, Jr.
*Assistant Examiner* — Frank Lawrence
(74) *Attorney, Agent, or Firm* — Law Office of: Michael A. Sanzo, LLC

(57) ABSTRACT

The present invention relates to a novel apparatus and to a method of simultaneous separation of multiple gas streams having different compositions by means of gas separation membranes, wherein the respective gas streams supplied to the apparatus and to the method may be subject to fluctuations in their respective volume flow rates and compositions.

20 Claims, 7 Drawing Sheets

Membrane block according to the invention with a gas distribution via a distributor conduit and supply conduits, and discharging of permeate gas and of retentate gas by means of collection pipes

(58) Field of Classification Search
USPC ........................................... 95/4, 7, 8; 96/43
See application file for complete search history.

(56) References Cited

U.S. PATENT DOCUMENTS

| | | | |
|---|---|---|---|
| 3,475,331 | A | 10/1969 | McLain et al. |
| 4,207,192 | A | 6/1980 | Coplan et al. |
| 4,210,536 | A | 7/1980 | Coplan et al. |
| 4,220,489 | A | 9/1980 | Coplan et al. |
| 4,430,219 | A | 2/1984 | Kuzumoto et al. |
| 4,631,128 | A | 12/1986 | Coplan et al. |
| 4,715,953 | A | 12/1987 | Leonard |
| 4,865,736 | A | 9/1989 | Coplan |
| 4,881,955 | A | 11/1989 | Bikson et al. |
| 5,053,058 | A | 10/1991 | Mitariten |
| 5,084,073 | A | 1/1992 | Prasad |
| 5,160,042 | A | 11/1992 | Bikson et al. |
| 5,299,749 | A | 4/1994 | Thorogood et al. |
| 5,411,662 | A | 5/1995 | Nicolas, Jr. et al. |
| 5,702,601 | A | 12/1997 | Bikson et al. |
| 5,727,903 | A | 3/1998 | Borray et al. |
| 5,837,032 | A | 11/1998 | Moll et al. |
| 5,837,033 | A | 11/1998 | Giglia et al. |
| 5,858,065 | A | 1/1999 | Li et al. |
| 5,897,729 | A | 4/1999 | Bikson et al. |
| 5,919,285 | A * | 7/1999 | Li ........................ B01D 53/226 95/52 |
| 6,197,090 | B1 | 3/2001 | Yamashita et al. |
| 6,495,046 | B1 | 12/2002 | Hartmann |
| 6,551,386 | B2 | 4/2003 | Weiler |
| 6,565,626 | B1 | 5/2003 | Baker et al. |
| 6,572,678 | B1 | 6/2003 | Wijmans et al. |
| 8,262,755 | B2 * | 9/2012 | Repasky .............. B01J 19/2475 95/45 |
| 8,568,512 | B2 | 10/2013 | Siegel et al. |
| 8,748,643 | B2 | 6/2014 | Priske et al. |
| 8,778,062 | B1 | 7/2014 | Snow, Jr. |
| 8,821,614 | B1 | 9/2014 | Albenze et al. |
| 8,969,628 | B2 | 3/2015 | Priske et al. |
| 8,999,036 | B2 | 4/2015 | Pierce |
| 8,999,038 | B2 | 4/2015 | Ungerank et al. |
| 9,005,335 | B2 | 4/2015 | Baker et al. |
| 9,314,735 | B2 | 4/2016 | Balster et al. |
| 9,353,040 | B2 | 5/2016 | Baumgarten et al. |
| 9,393,537 | B2 | 7/2016 | Hamers et al. |
| 9,428,433 | B2 | 8/2016 | Fridag et al. |
| 9,469,048 | B2 | 10/2016 | Ungerank et al. |
| 9,624,153 | B2 | 4/2017 | Becker et al. |
| 9,643,153 | B2 | 5/2017 | Meier et al. |
| 9,676,805 | B2 | 6/2017 | Dyballa et al. |
| 9,713,791 | B2 | 7/2017 | Priske et al. |
| 9,770,687 | B2 | 9/2017 | Ungerank et al. |
| 9,873,093 | B2 | 1/2018 | Visser et al. |
| 9,988,326 | B2 | 6/2018 | Paget et al. |
| 10,017,443 | B2 | 7/2018 | Leuken et al. |
| 10,040,036 | B2 | 8/2018 | Ungerank et al. |
| 10,118,136 | B2 | 11/2018 | Ungerank et al. |
| 10,456,750 | B2 | 10/2019 | Visser et al. |
| 10,471,380 | B2 | 11/2019 | Priske |
| 10,792,619 | B2 | 10/2020 | Lim et al. |
| 10,905,995 | B2 | 2/2021 | Prince et al. |
| 10,933,378 | B2 | 3/2021 | Visser et al. |
| 11,498,026 | B2 | 11/2022 | Wu et al. |
| 11,857,916 | B2 | 1/2024 | Winkler et al. |
| 12,337,276 | B2 | 6/2025 | Pedersen et al. |
| 2006/0065588 | A1 | 3/2006 | Koch et al. |
| 2007/0113736 | A1 | 5/2007 | Bandosz |
| 2007/0125537 | A1 | 6/2007 | Lokhandwala et al. |
| 2008/0072754 | A1 | 3/2008 | Burban et al. |
| 2010/0288701 | A1 | 11/2010 | Zhou et al. |
| 2012/0000355 | A1 | 1/2012 | Sharma et al. |
| 2013/0071594 | A1 | 3/2013 | Bikson et al. |
| 2014/0137735 | A1 | 5/2014 | Bhandari et al. |
| 2014/0241968 | A1 | 8/2014 | Wennergren et al. |
| 2016/0082393 | A1 | 3/2016 | Priske et al. |
| 2016/0151744 | A1 | 6/2016 | Visser et al. |
| 2017/0198227 | A1 | 7/2017 | Kim |
| 2017/0320009 | A1 | 11/2017 | Hirata et al. |
| 2018/0169584 | A1 | 6/2018 | Visser et al. |
| 2018/0221824 | A1 | 8/2018 | Visser et al. |
| 2019/0001263 | A1 | 1/2019 | Prince et al. |
| 2020/0047112 | A1 | 2/2020 | Chareyre et al. |
| 2020/0047113 | A1 | 2/2020 | Chareyre et al. |
| 2020/0254383 | A1 | 8/2020 | Roodbeen |
| 2020/0269188 | A1 | 8/2020 | Hasegawa et al. |
| 2021/0339189 | A1 | 11/2021 | Winkler et al. |
| 2021/0363463 | A1 | 11/2021 | Xie et al. |
| 2021/0394125 | A1 | 12/2021 | Peters et al. |
| 2022/0001326 | A1 * | 1/2022 | Serra Alfaro ........ B01D 53/226 |
| 2022/0134274 | A1 | 5/2022 | Pedersen et al. |
| 2023/0271130 | A1 | 8/2023 | Priske et al. |

FOREIGN PATENT DOCUMENTS

| | | |
|---|---|---|
| EP | 1 585 181 | 10/2005 |
| EP | 1921443 | 5/2008 |
| EP | 3454059 | 3/2019 |
| GB | 2-010-794 | 7/1979 |
| GB | 2534383 | 7/2016 |
| JP | 2018086620 | 6/2018 |
| JP | 2021088484 | 6/2021 |
| KR | 10-1840337 | 3/2018 |
| KR | 10-1840340 | 3/2018 |
| KR | 10-1840343 | 3/2018 |
| KR | 10-1863058 | 6/2018 |
| WO | 2013049109 | 4/2013 |
| WO | WO 2014/183977 | 11/2014 |
| WO | WO 2015/017875 | 2/2015 |
| WO | WO 2015/177009 | 11/2015 |
| WO | WO 2016/198450 | 12/2016 |
| WO | WO 2019/165597 | 6/2019 |
| WO | WO 2022/012944 | 1/2022 |
| WO | WO 2023/011919 | 9/2023 |

OTHER PUBLICATIONS

English translation translation of the Written Opinion of the International Searching Authority for PCT/EP2024/051850 filed, Jan. 26, 2024; corresponding to copending U.S. Appl. No. 19/150,253.
International Preliminary Report on Patentability for PCT/EP2024/051850 filed, Jan. 26, 2024; corresponding to copending U.S. Appl. No. 19/150,253.
European Search Report and Search Opinion for U.S. Appl. No. 19/150,253 (with partial English language machine translation of the Search Opinion attached); corresponding to copending U.S. Appl. No. 19/150,253.
Bains, et al., "CO2 capture from the industry sector," Progress in Energy and Combustion Science 63:146-172 (2017).
Copending U.S. Appl. No. 19/150,253, filed Jul. 23, 2025; This application has not yet published, a pdf is enclosed herewith.
International Search Report for corresponding PCT/EP2022/070296 filed Jul. 20, 2022.
Written Opinion of the International Searching Authority for corresponding PCT/EP2022/070296 filed Jul. 20, 2022.
International Preliminary Report on Patentability for corresponding PCT/EP2022/070296 filed Jul. 20, 2022.
International Search Report for international application PCT/EP2020/051497, filed Jan. 22, 2022, corresponding to copending application U.S. Appl. No. 17/427,555.
Written Opinion of the International Searching Authority for international application PCT/EP2020/051497, filed Jan. 22, 2022, corresponding to copending application U.S. Appl. No. 17/427,555.
International Preliminary Report on Patentability for international application PCT/EP2020/051497, filed Jan. 22, 2022, corresponding to copending application U.S. Appl. No. 17/427,555.
International Search Report for international application PCT/EP2021/068142, filed Jul. 1, 2021, corresponding to copending application U.S. Appl. No. 18/015,866.
Written Opinion of the International Searching Authority for international application PCT/EP2021/068142, filed Jul. 1, 2021, corresponding to copending application U.S. Appl. No. 18/015,866.

(56) References Cited

OTHER PUBLICATIONS

International Preliminary Report on Patentability for international application PCT/EP2021/068142, filed Jul. 1, 2021, corresponding to copending application U.S. Appl. No. 18/015,866.

European Search Report and Search Opinion for corresponding EP 20185597 filed Jul. 14, 2020.

Alqaheem, et al., "Polymeric Gas-Separation Membranes for Petroleum Refining," *International Journal of Polymer Science* 2017:1-19 (Jan. 2017).

Castrillon, et al., "$CO_2$ and $H_2S$ Removal from $CH_4$-Rich Streams by Adsorption on Activated Carbons Modified with $K_2CO_3$, NaOH, or $Fe_2O_3$," *Energy & Fuels* 30(11):9596-9604 (Oct. 2016).

Chen, et al., "Membrane gas separation technologies for biogass upgrading," *RSC Advances* 5(31):24399-24448 (Jan. 2015).

Chiang, et al., "Effect of Relative Humidity on Adsorption Breakthrough of $CO_2$ on Activated Carbon Fibers," *Materials* 10(11):1-14 (Nov. 2017).

Falbo, et al., "Polyimide hollow fiber membranes for $CO_2$ separation from wet gas mixtures," *Brazilian Journal of Chemical Engineering* 31(4):1023-1034 (Dec. 2014).

Leuch, et al., "Hydrogen Sulfide Adsorption and Oxidation onto Activated Carbon Cloths: Applications to Odorous Gaseous Emission Treatments," *Langmuir* 19(26):10869-877 (Dec. 2003).

Scholz, et al., "Modeling Gas Permeation by Linking Nonideal Effects," *Ind. Eng. Chem. Res.* 52(3):1079-1088 (Jan. 2013).

Shin, et al., "Biogas separation using a membrane gas separator: Focus on $CO_2$ upgrading without $CH_4$ loss," *Process Safety and Environmental Protection* 129:348-358 (Jul. 2019).

Yin, et al., "Effects of temperature and relative humidity on the methane permeability rate of biogas storage membranes," *International Journal of Green Energy* 13(9):951-956 (Jul. 2016).

U.S. Appl. No. 15/748,183, filed Jan. 28, 2018, US-2018/0221824 A1, Aug. 9, 2018, Visser.

U.S. Appl. No. 17/348,747, filed Jun. 15, 2021, US-2021-0394125 A1, Dec. 23, 2021, Peters.

U.S. Appl. No. 17/427,555, filed Jul. 30, 2021, US-2022/0134274 A1, May 5, 2022, Pedersen.

U.S. Appl. No. 18/015,866, filed Jan. 12, 2023, US-2023/0271130A1, Aug. 31, 2023, Priske.

Schaser, N., "Optimizing your Thermal Oxidizer to Save Energy and Operating Costs through Heat Recovery," Dec. 2017. Retrieved from the internet: ,URL:https://www.durr.com/en/media/news/news-detail/view/optimizing-your-thermal-oxidizer-to-save-energy-and-0perating-costs-through-heat-recovery (Year 2017).

* cited by examiner

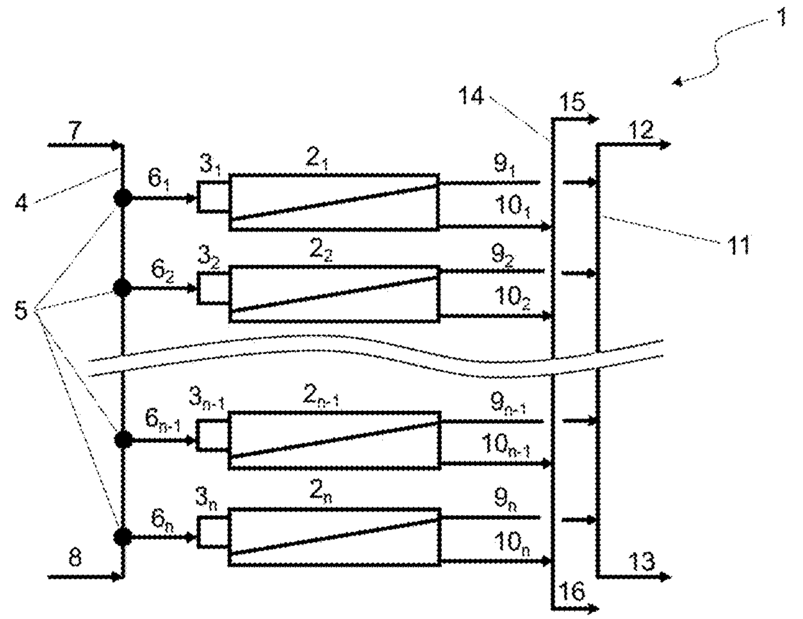

Figure 1: Membrane block according to the invention with a gas distribution via a distributor conduit and supply conduits, and discharging of permeate gas and of retentate gas by means of collection pipes

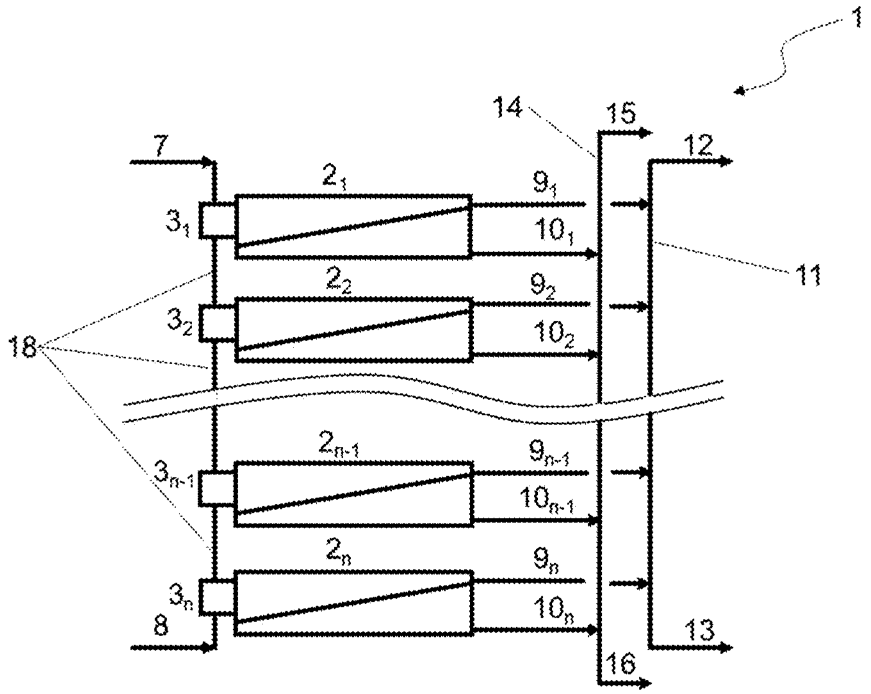

Figure 2: Membrane block according to the invention with gas distribution via connection conduits, and discharging of permeate gas and of retentate gas by means of collection pipes

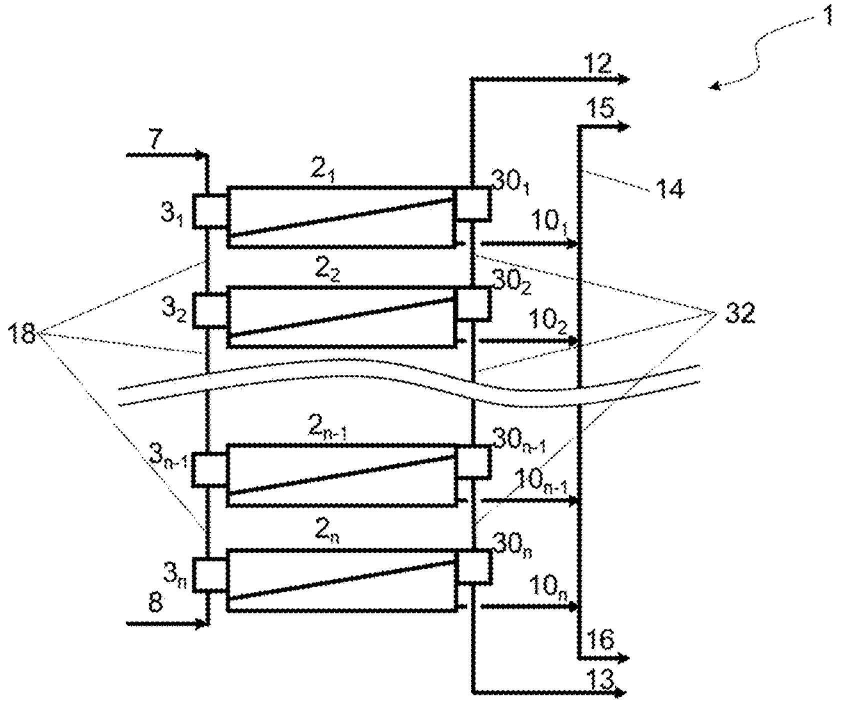
Figure 3: Membrane block according to the invention with a gas distribution by means of distributor conduit and discharging of permeate gas by means of collection pipes and discharging of retentate gas by means of retentate connection conduit
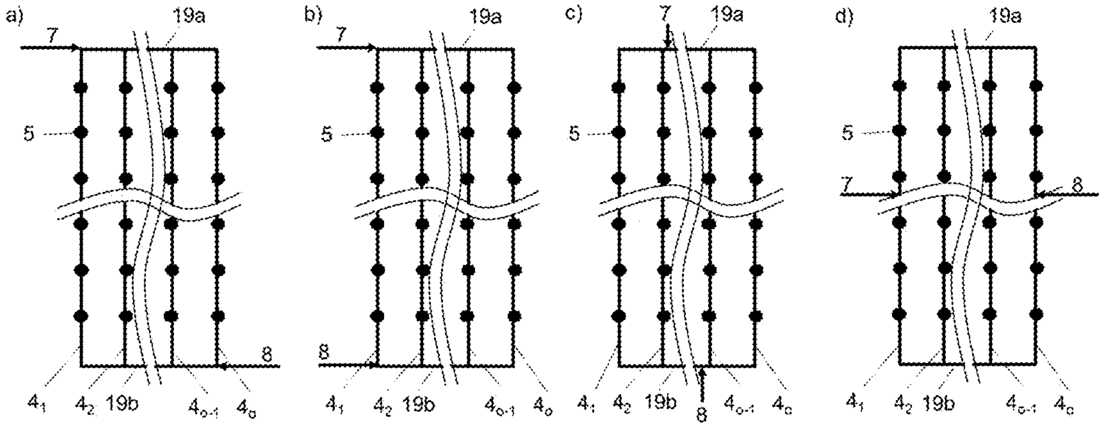
Figure 4: Linear semilattice of membrane blocks with distributor conduits and two gas sources

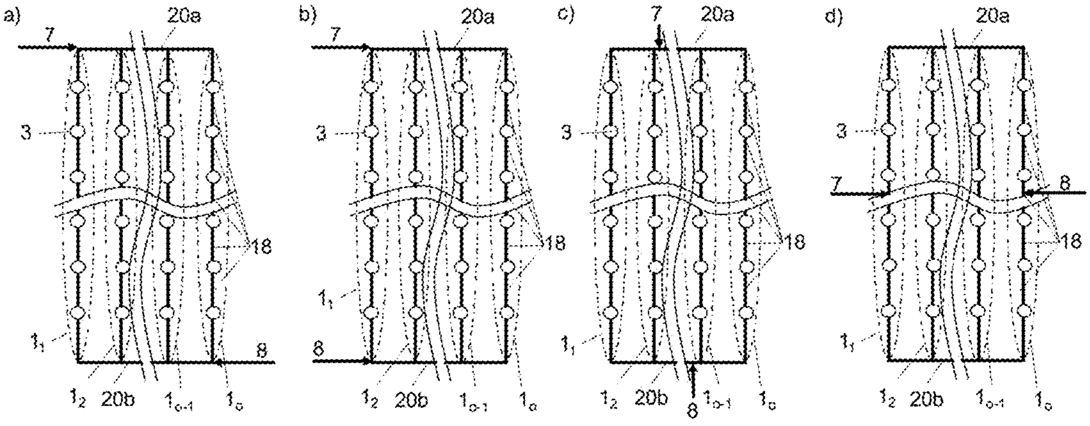
Figure 5: Linear semilattice of membrane blocks with connection conduits and two gas sources
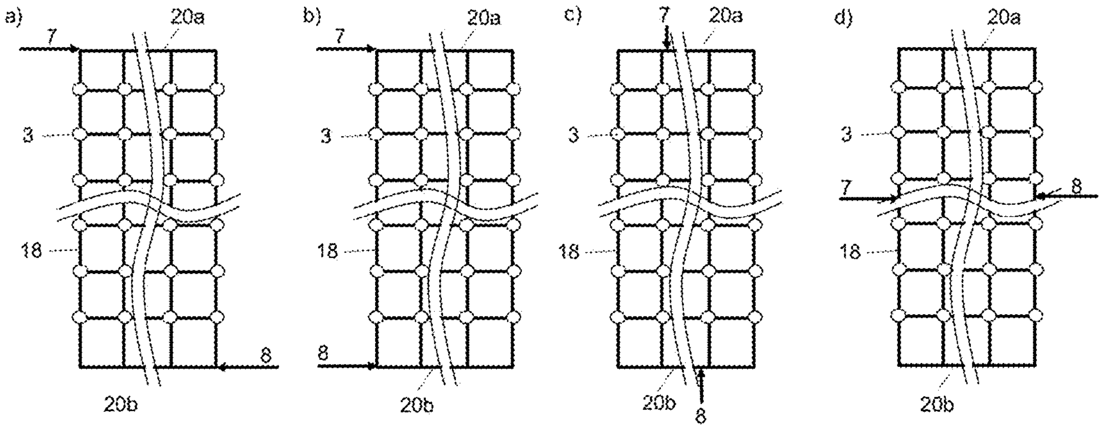
Figure 6: Linear complete lattice of membrane blocks with connection conduits and cross-distributor conduits and two gas sources

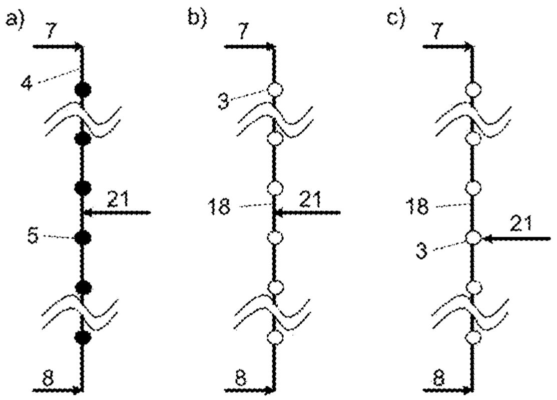
Figure 7: Membrane block according to the invention with distributor respectively connection conduit(s) and three gas sources
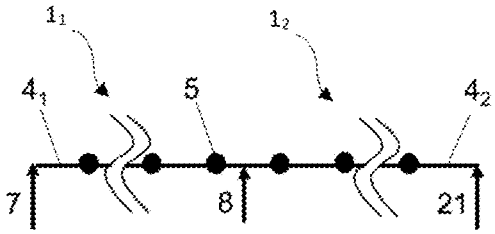
Figure 8: Two membrane blocks according to the invention, each with distributor conduit, and three gas sources

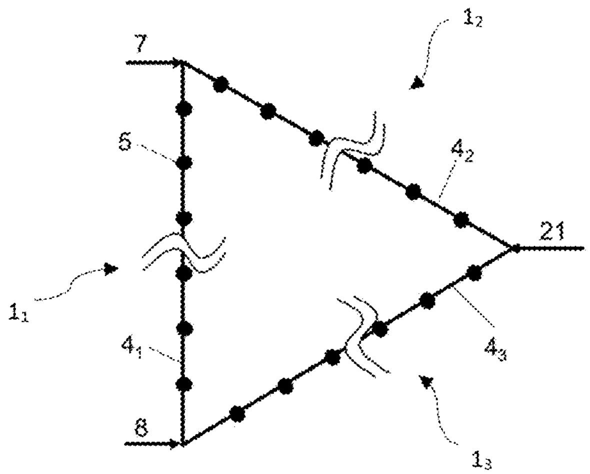
Figure 9: Three membrane blocks according to the invention, each with distributor conduit, and three gas sources in a ring circuit
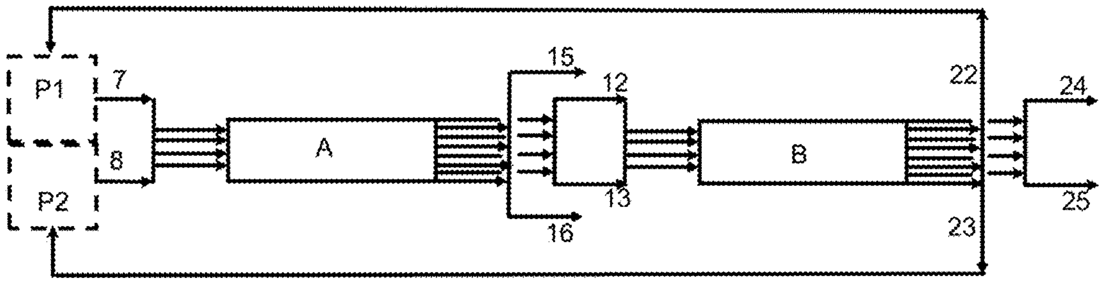
Figure 10: 2-stage interconnection of membrane separation stages according to the invention

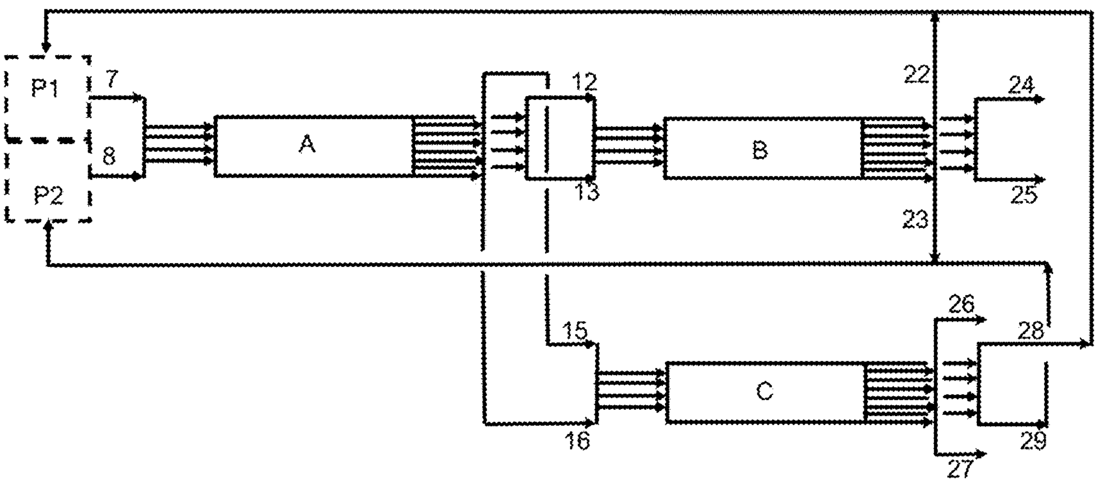
Figure 11: 3-stage interconnection of membrane separation stages according to the invention
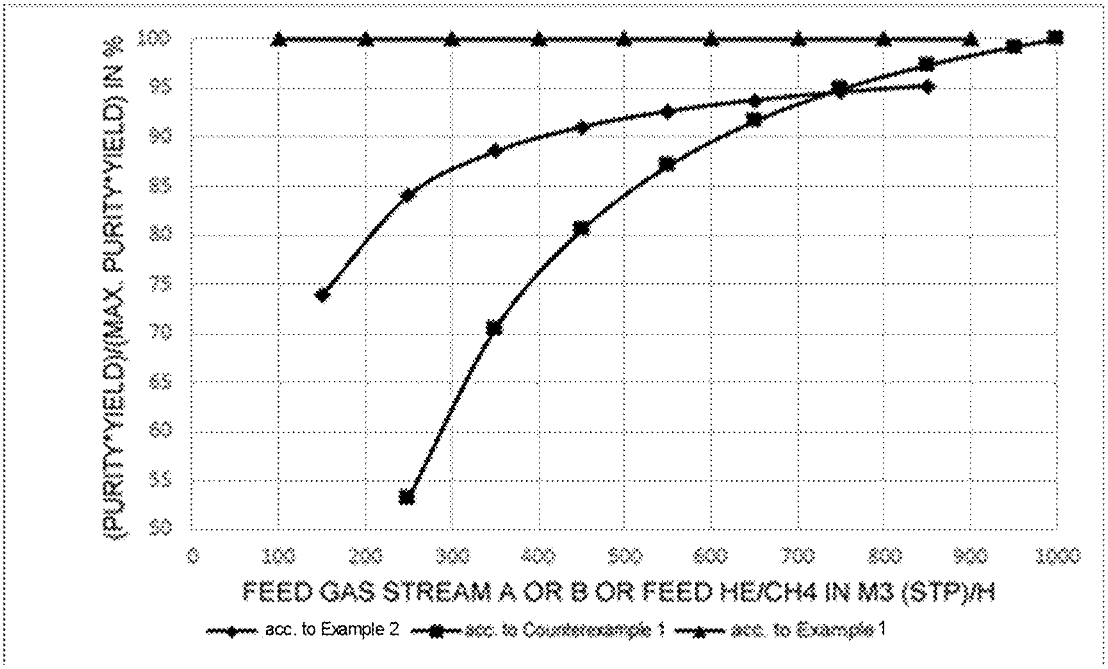
Figure 12: Comparison of the products of yield and purity of methane in the retentate (retentate gas conduit (12) or retentate from the He/$CH_4$ separation unit) based on the maximum achievable value from Examples 1 and 2 with Comparative Example 1

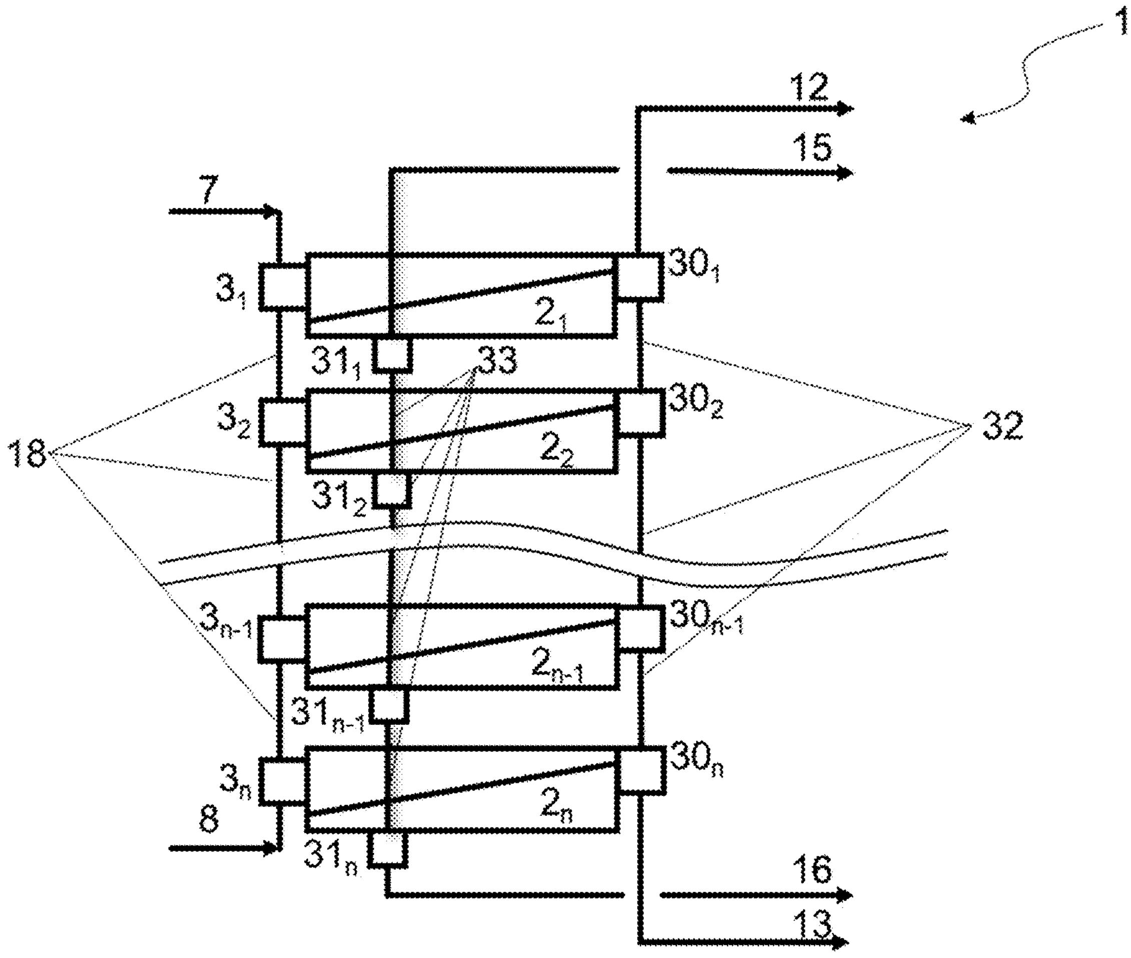
Figure 13: Membrane block with permeate gas outlets and connection conduits

APPARATUS AND METHOD FOR SIMULTANEOUSLY TREATING DIFFERENT FLUCTUATING GAS FLOWS

CROSS REFERENCE TO RELATED APPLICATIONS

The present application is US national stage of international application PCT/EP2022/070296, which had an international filing date of Jul. 20, 2022 and which was published on Feb. 9, 2023. The PCT application claims priority to EP 21189420.9, filed on Aug. 3, 2021. The content of these prior filings is hereby incorporated by reference in their entirety.

FIELD OF THE INVENTION

The present invention relates to a novel apparatus and to a method of simultaneous separation of multiple gas streams having different compositions by means of gas separation membranes, wherein the respective gas streams supplied to the apparatus and to the method may be subject to fluctuations in their respective volume flow rates and compositions.

BACKGROUND OF THE INVENTION

Simultaneous separation of multiple gas streams having different and fluctuating compositions may be necessary, for example, in the case of ex-situ methanation of biogases or comparable gases with hydrogen when the hydrogen stream is available only in fluctuating volumes, as is frequently the case for hydrogen from electrolyses which have been run with power from renewable sources such as wind power. WO2015/017875 describes a process in which there is simultaneous or alternating separation of biogas and product gas from the methanation. The problem of the fluctuating levels of reactant and product streams is solved via complex gas and liquid storage means.

Alternative approaches for the treatment of different, fluctuating gas streams having gas separation membranes are processes in which either separate separation units are provided for the different gas streams, or in which the streams are mixed and supplied as a mixed stream to the separation unit, which means that the desired separation outcome can be achieved only with distinct extra complexity, if at all. Moreover, the fluctuations in the gas streams with regard to amount or composition have to be compensated for by interventions, some of them significant, into operating parameters such as pressure, temperature and membrane area. The provision of corresponding overcapacities or gas storage means is costly.

Thus, US 2020/0254383, for example, discloses a device for separation of gas mixtures which has only one feed gas conduit. This device is not able to treat two different, fluctuating gas streams with different compositions and volume flow rates efficiently and without complex control and regulation technology.

There is therefore a great need for efficient apparatuses and methods for simultaneous separation of multiple gas streams having different compositions.

SUMMARY OF THE INVENTION

It was therefore an object of the present invention to provide a novel apparatus and a novel method that have the disadvantages of the prior art apparatuses and methods only to a reduced degree, if at all.

A specific object of the present invention was that of providing a novel apparatus and a novel method in which the treatment of different, fluctuating gas streams can be achieved with a very simple apparatus or simple method, preferably with overcapacities reduced as far as possible with regard to membrane area and/or gas storage means and/or compressor output and/or temperature control and/or pressure control.

A further, specific object of the present invention was that of providing a novel apparatus and a novel method that do not need complex control and regulation technology.

A further, specific object of the present invention was that of providing a novel apparatus and a novel method having very high flexibility with regard to the use of the gas streams obtained after the separation.

A further, specific object of the present invention was that of providing a novel apparatus and a novel method adapted for the use of renewable energies that are available only in significantly fluctuating amounts, and hence making a contribution to climate protection.

A further, specific object of the present invention was that of providing a novel apparatus and a novel method that allow gas streams that fluctuate in opposing directions, in some cases to a significant degree, to be brought to the desired target purities of the respective product streams for any possible operating point with an apparatus of maximum simplicity.

Further objects that are not stated explicitly will be apparent from the overall context of the description, claims, examples and figures that follow.

The inventors have now found that, surprisingly, the stated objects are achieved by the apparatus and method described herein.

BRIEF DESCRIPTION OF THE DRAWINGS

FIG. 1: Membrane block according to the invention with a gas distribution via a distributor conduit and supply conduits, and discharging of permeate gas and of retentate gas by means of collection pipes.

FIG. 2: Membrane block according to the invention with gas distribution via connection conduits, and discharging of permeate gas and of retentate gas by means of collection pipes.

FIG. 3: Membrane block according to the invention with a gas distribution by means of distributor conduit and discharging of permeate gas by means of collection pipes and discharging of retentate gas by means of retentate connection conduit.

FIG. 4: Linear semilattice of membrane blocks with distributor conduits and two gas sources.

FIG. 5: Linear semilattice of membrane blocks with connection conduits and two gas sources.

FIG. 6: Linear complete lattice of membrane blocks with connection conduits and cross-distributor conduits and two gas sources.

FIG. 7: Membrane block according to the invention with distributor respectively connection conduit(s) and three gas sources.

FIG. 8: Two membrane blocks according to the invention, each with distributor conduit, and three gas sources.

FIG. 9: Three membrane blocks according to the invention, each with distributor conduit, and three gas sources in a ring circuit.

FIG. 10:2-stage interconnection of membrane separation stages according to the invention.

FIG. 11:3-stage interconnection of membrane separation stages according to the invention.

FIG. 12: Comparison of the products of yield and purity of methane in the retentate (retentate gas conduit (12) or retentate from the He/CH4 separation unit) based on the maximum achievable value from Examples 1 and 2 with Comparative Example 1.

FIG. 13: Membrane block with permeate gas outlets and permeate connection conduits.

DETAILED DESCRIPTION OF THE INVENTION

It is a feature of the apparatus according to the invention and of the method that two or more feed gas streams of different composition are supplied to a membrane separation stage, wherein

- the membrane separation stage contains one membrane block or multiple membrane blocks,
- the membrane block or the membrane blocks each comprise(s) multiple membrane separation units connected in parallel,
- the feed gas streams are supplied to a gas distributor at spatially separate sites, such that two or preferably more than two membrane separation units are disposed between the attachment points of the feed gas streams.

Elucidated in detail using the example of a membrane block supplied with two feed gas streams 1 and 2, what this means is that one or more membrane separation unit(s) of the membrane block, by means of the gas distribution system according to the invention, is/are supplied with the feed gas stream 1 having a composition 1, and one or more different membrane separation unit(s) of the membrane block, by means of the gas distribution system according to the invention, with the feed gas stream 2 having the composition 2. Further membrane separation units in the membrane block again, different from the aforementioned membrane separation units, may also be supplied by means of the gas distribution system according to the invention with mixed gas streams containing, preferably consisting of, a mixture of the feed gas streams 1 and 2. Preferably, a minimum number of, more preferably no, membrane separation units of the membrane block are supplied with mixed gas streams, and a maximum number either with feed stream 1 or with feed stream 2.

The gas distribution system according to the invention can adjust or else actively control or regulate the number of membrane separation units supplied with the respectively different gas streams. The adjustment is preferably effected via the volume flow rate or mass flow rate of the respective feed gas streams and/or via the inlet pressure of the feed gas streams relative to one another. This means that, for example, when the volume flow rate and/or mass flow rate and/or pressure of a feed gas stream decreases, this is supplied to fewer membrane separation units in the respective membrane blocks and simultaneously a different feed gas stream is supplied to more membrane separation units in turn. If the control is effected via the pressures of the feed gas streams, the pressure differential range between the feed gas streams which is employable in accordance with the invention is limited to pressure differentials that result from supply of each feed gas stream to at least one membrane separation unit of the membrane block. This is because, if the pressure differential becomes too great, it would be possible for the feed gas stream having the lower pressure to be displaced entirely from the membrane separation stage.

The apparatus according to the invention and the method according to the invention have the advantage that, in the case of opposing capacity demands of the feed gas streams to be separated, it is possible to react flexibly and quickly and to always utilize the separation capacities in the separation stages and membrane blocks in an optimal manner. A particularly great advantage of the apparatus according to the invention and of the method according to the invention is that the control and regulation can be achieved without any great apparatus and control complexity, for example a high number of automatic valves, and it is possible to treat more of one feed gas stream than of another feed gas stream.

The gas distribution system according to the invention additionally has the advantage that it can be configured such that the gas streams to be purified can be supplied to the respective membrane separation units only with a low degree of mixing, if any. This enables charging of the different membrane separation units with feed gas streams to be separated in their original or largely original composition. Such a system in turn has the advantage that different feed gas streams can be treated very substantially separately within one and the same installation.

The possibility of supplying the individual membrane separation units with different gas streams in their original or largely original composition results in different permeate and retentate streams in the different membrane separation units in terms of composition and/or volume flow rate.

The apparatus according to the invention and the method according to the invention do not need complex additional equipment, or need distinctly fewer or smaller pieces of additional equipment, for example buffer vessels and/or pressure reservoirs for absorbing fluctuations in the different gas streams to be purified. They thus have considerable economic benefits. It is a particular feature of the apparatus according to the invention and the method that these fluctuations can be compensated for with a minimum level of apparatus complexity, such that constant product streams can be obtained in terms of their volume flow rate and/or composition.

If, for example, there is a drop in the pressure of the first feed gas stream within the scope of the range permissible in accordance with the invention for the pressure differential with respect to the second feed gas stream, this merely has the effect in the apparatus according to the invention or the method according to the invention that this feed gas stream is supplied to fewer membrane separation units and the second feed gas stream is supplied to more membrane separation units in turn. No membrane separation unit has to be run under partial load, and the permeate and retentate pressures can be kept constant. If, by contrast, an apparatus were to be used as in the comparative example, i.e. the first feed gas stream were to be supplied to a first membrane separation stage and the second feed gas stream to a second membrane separation stage, and the pressure in the 1st feed gas stream were to fall, this would entail a simultaneous drop in the pressure of the retentate gas streams of the first membrane separation stage and the need to use a second compressor for recompression of these retentate gas streams.

If, for example, there is a drop in the volume of the first feed gas stream, this merely has the effect in the apparatus according to the invention or the method according to the invention that this feed gas stream is supplied to fewer membrane separation units and simultaneously the second feed gas stream is supplied to more membrane separation units. No membrane separation unit has to be run under partial load, and the permeate and retentate pressures can be kept constant. If, by contrast, an apparatus were to be used as in the comparative example, i.e. the first feed gas stream were to be supplied to a first membrane separation stage and the second feed gas stream to a second membrane separation stage, and the volume in the 1st feed gas stream were to fall, it would be necessary to adjust the separation capacity of the first membrane separation stage. Possible measures would be the shutdown of membrane separation units by valves, adjustment of the operating temperature, increasing the permeate pressure or reducing the retentate pressure. A reduction in the retentate pressure could still be implemented with relatively low complexity, but a drop in the pressure of the retentate gas streams would frequently require a second compressor or booster for recompression of the retentate gas streams, since a constant pressure of the retentate gas streams is frequently required in the case of further use of the retentate.

The apparatus according to the invention and the method according to the invention are especially advantageous for increasing the input of renewable energies, since these are frequently available only in significantly fluctuating amounts. They hence make an important contribution to climate protection.

Further benefits that are not stated explicitly will be apparent from the overall context of the description, claims, examples and figures that follow.

Individual features indicated and/or depicted hereinafter in connection with specific working examples are not restricted to these working examples or to the combination with the other features of these working examples, but can be combined where technically possible with any other variants, even if these are not separately discussed in the present documents.

Identical reference symbols in the individual figures and illustrations of the drawings identify identical or similar components or components acting in an identical or similar manner. The depictions in the drawing also illustrate those features without reference symbols, irrespective of whether such features are subsequently described or not. On the other hand, features which are included in the present description but are not visible or depicted in the drawing are also readily apparent to a person skilled in the art.

The present invention provides a device for separation of gas mixtures, comprising a. a first feed gas conduit (7) which is adapted or configured for transporting a first feed gas stream, and a second feed gas conduit (8) which is adapted or configured for transporting a second feed gas stream of different composition from the first feed gas stream, b. a membrane separation stage, comprising one membrane block (1) or multiple membrane blocks (1), wherein the membrane block(s) (1) each comprise(s) multiple membrane separation units (2) connected in parallel, in which each membrane separation unit (2) has a gas inlet (3) and gas separation membranes, and the gas mixture supplied via the gas inlet (3) is separated by means of the gas separation membranes into a retentate gas stream and a permeate gas stream, and each membrane separation unit (2) has a retentate gas outlet (30) for the retentate gas stream which is preferably connected to a retentate gas conduit (9) or connected by means of one or more retentate connection conduit(s) (32) to one or two retentate gas outlet(s) (30) of the adjacent membrane separation unit(s) (2) of the same membrane block (1), and a permeate gas outlet (31) for the permeate gas stream which is preferably connected to a permeate gas conduit (10) or connected by means of one or more permeate connection conduit(s) (33) to one or two permeate gas outlet(s) (31) of the adjacent membrane separation unit(s) (2) of the same membrane block (1), and c. a gas distributor configured such that it comprises connection conduits (18) that each connect the gas inlets (3) of two adjacent membrane separation units (2) of a membrane block (1) to one another, preferably directly and immediately, and/or comprises one or more distributor conduit(s) (4) each containing multiple branches (5) that are each connected by means of separate supply conduits (6) to the gas inlets (3) of the individual membrane separation units (2) of a membrane block (1), wherein one or more branch(es) (5) may additionally also have an attachment means for a feed gas conduit, such that, by means of the branch(es) (5), in each case a feed gas conduit and a supply conduit (6) may simultaneously be connected to the respective distributor conduit (4), if the membrane separation stage comprises multiple membrane blocks (1), it comprises conduits, preferably conduits (19*a*, 19*b*, 20*a*, 20*b*) that connect the membrane blocks (1) of the membrane separation stage to one another, the first feed gas conduit (7), the second feed gas conduit (8), and optionally further feed gas conduits are each independently connected, preferably immediately and directly, at spatially separate sites to a distributor conduit (4) or a connection conduit (18) or a branch (5) or, if present, to a conduit that connects the membrane blocks (1) of the membrane separation stage to one another, preferably a conduit (19*a*, 19*b*, 20*a* or 20*b*), or to a gas inlet (3) of a membrane separation unit (2), where the attachment points are arranged such that two or more than two branches (5) and/or two or more than two gas inlets (3) are disposed between the attachment points of the first feed gas conduit (7) and the second feed gas conduit (8).

The number of branches (5) and/or gas inlets (3) between the attachment points of the first feed gas conduit (7) and the second feed gas conduit (8) is preferably at least 3, more preferably at least 4, even more preferably at least 5, especially preferably at least 7, and very especially preferably at least 9. The upper limit may correspond, for example, to the number of membrane separation units per block, but may also increase further in the case of multiple membrane blocks per membrane separation stage, as shown, for example, in FIGS. 4*a* and 5*a*.

If a membrane separation stage according to the invention is supplied with more than two feed gas conduits, the attachment points of the feed gas conduits are preferably arranged spatially such that two or more than two branches (5) and/or two or more than two gas inlets (3) are disposed between the attachment points of two feed gas conduits in each case. Examples of this can be found in FIGS. 4 to 9.

A "conduit" in the context of the present invention is understood to mean pipe conduits through which the gas streams flow.

What is meant in the context of the present invention by "a conduit attached immediately and directly to another conduit" is that a gas stream, at the moment when it exits from the first of the two conduits attached immediately and directly to one another, enters the second of the conduits attached immediately and directly, i.e. does not have to pass through any third conduit between the first and second pipe conduits.

A membrane separation unit is essentially characterized by the presence of industrially utilizable ports for the pressure-side supply of a gas stream to be separated (gas inlet (3)), called the feed or feed stream or feed gas or feed gas stream, to the membrane material, and for the removal from the gas pressure side of what is called the retentate or retentate gas or retentate gas stream or retentate stream, and for the removal of gas(es) that has/have passed through the membrane material, called the permeate or permeate gas or permeate gas stream or permeate stream. In the case of generation of driving force by purge gas, there is the permeate-side connection option for such a purge gas. It is preferable that the pressure-side concentration, pressure and temperature profiles in the respective main flow direction are continuous, and that the permeate is obtained without an intermediate step in a common permeate space, for example a housing or a permeate tube of the respective membrane separation unit.

Preferred membrane separation units are the following embodiments:

A. a gas separation module,

B. a housing equipped with a gas separation cartridge or multiple gas separation cartridges connected in series, with the membrane separation unit in the embodiment with multiple gas separation cartridges connected in series preferably configured such that either the retentate gas outlet of the respective gas separation cartridges is connected directly to the gas inlet of the respective downstream gas separation cartridge by means of a gas conduit and the permeates from all gas separation cartridges are obtained in a directly communicating gas space, for example the housing space, or the retentate gas outlet of the respective gas separation cartridge is connected to the gas inlet of the respective downstream gas separation cartridge by means of a communicating gas space, for example the housing space, and each cartridge has a permeate collection pipe connected directly to the permeate collection pipe of the respective downstream gas separation cartridge by means of a gas conduit, C. multiple gas separation modules connected in series, with the retentate gas outlet of the respective gas separation module connected directly to the gas inlet of the respective downstream gas separation module by means of a gas conduit, and the membrane separation unit configured, for example by means of a permeate pipe of the respective membrane separation unit, such that the permeates from all gas separation modules of the membrane separation unit are combined, D. multiple series-connected housings equipped with a gas separation cartridge or multiple series-connected gas separation cartridges, with each individual housing preferably configured as described for embodiment B., and the series-connected housings configured such that the retentate gas outlet of the respective housing is directly connected in each case to the gas inlet of the respective downstream housing by means of a gas conduit, and the membrane separation unit is configured, for example by means of a permeate pipe of the respective membrane separation unit, such that the permeate from all housings of the membrane separation unit are combined.

Preferred gas separation cartridges and housings equipped with one or more series-connected gas separation cartridges are disclosed in EP 3307424 B1. The content of this patent specification is hereby incorporated into the content of this description.

Gas separation modules differ from gas separation cartridges in that they constitute a complete separation unit, including the pressure-resistant housing. Cartridges, by contrast, are used in separate, pressure-resistant housings, preferably in housings installed in a fixed manner in the separation device; in this case, it is possible to use a cartridge, but also several successively series-connected cartridges, in the housing. Cartridges have the advantage that lower costs arise on exchange thereof than in the case of modules, since the costly, pressure-resistant housing need not be replaced as well.

While generally small-volume cartridges or modules are used in the sector of biogas processing, large-volume cartridges or modules are required, for example, in the sector of purification of natural gas to be able to cope with large volumes of gas. In addition, this field of use requires cartridges and modules which can be used at relatively high feed gas pressures, preferably of 30 to 100 bar.

Gas separation modules and cartridges may contain flat membranes wound, for example, around a permeate pipe in a central arrangement.

In addition, there are cartridges or modules comprising hollow fibre membranes. Examples of these can be found in U.S. Pat. Nos. 3,422,008, 3,455,460, 3,475,331, 4,207,192, 4,210,536, 4,220,489, 4,430,219, 4,631,128, 4,715,953, 4,865,736, 4,881,955, 5,084,073, 5,160,042, 5,299,749, 5,411,662, 5,702,601, 5,837,032, 5,837,033, 5,897,729, 7,410,580, 7,998,254, 8,747,980, 8,778,062. The content of these publications is hereby explicitly incorporated into the content of the present description.

In the context of the present invention, in principle, it is possible to use any membrane separation units known to the person skilled in the art. Preferred membrane separation units are described in US 2016/0151744, U.S. Pat. No. 10,933,378, US2018/0221824. The content of these publications is hereby explicitly incorporated into the content of the present description.

A membrane separation stage according to the invention comprises a "membrane block" or multiple "membrane blocks", in which case the membrane block or the membrane blocks each in turn comprise(s) multiple parallel-connected membrane separation units. Each membrane block of a membrane separation stage according to the invention preferably comprises at least two, more preferably more than 5, most preferably more than 10, membrane separation units. The number of membrane separation units per membrane block is guided by the gas sources and especially the gas volume to be processed. The use of several hundred membrane separation units is possible in the field of gas separation with membranes.

The device according to the invention additionally encompasses a "gas distributor". The gas distributor is preferably configured such that the feed gas streams are supplied by means of the gas distributor to the membrane separation units of the membrane block or of the respective membrane blocks in such a way that they flow towards each other in a conduit within a membrane block and/or flow towards each other in one or more conduits that interconnect the membrane blocks of a membrane separation stage.

What is encompassed by "flow towards each other in a conduit" is the following embodiments (nonexhaustive listing):

two gas streams flow towards each other in one and the same pipe, two connection conduits are attached to a gas inlet of a membrane separation unit of a membrane block of a membrane separation stage according to the invention. Two feed gas streams flow towards each other through the two connection conduits and meet in the gas inlet, in a distributor conduit according to the invention containing branches, two feed gas streams flow towards each other and meet one another between two branches or at a branch, in a gas conduit according to the invention connecting multiple membrane blocks of a membrane separation stage to one another and therefore having a branch to the respective membrane blocks, two feed gas streams flow towards each other and meet one another between two branches or at a branch.

More preferably, the feed gas streams are supplied by means of the gas distributor to the membrane separation units of the membrane block or of the respective membrane blocks in such a way that at least two membrane separation units of a membrane block, more preferably in each case at least two membrane separation units of multiple membrane blocks of a membrane separation stage, most preferably in each case at least two membrane separation units in all membrane blocks of a membrane separation stage, are each supplied with gas streams of different composition.

In the two above-described preferred embodiments, attachment points of the first feed gas conduit (7) and the second feed gas conduit (8) are therefore more preferably independently arranged spatially in such a way that the first feed gas stream and the second feed gas stream flow towards each other within one membrane block (1) or multiple membrane blocks (1) of the membrane separation stage, preferably in one or more distributor conduit(s) (4) and/or in connection conduit(s) (18), and/or within the conduit(s) that connect the membrane blocks (1) of the membrane separation stage to one another, preferably the conduit(s) (19*a*, 19*b*, 20*a*, 20*b*), and/or that at least two different membrane separation units (2) in one membrane block (1), preferably in multiple membrane blocks (1), more preferably in all membrane blocks (1), of the membrane separation stage are each supplied with gas streams of different composition.

The gas distributor according to the invention is preferably configured such that the feed gas streams flow towards each other as described above, such that there are contacts sites in the device according to the invention where the feed gas streams supplied to the gas distributor meet. At these contact sites, there may be some degree of mixing of the feed gas streams. Preferably in accordance with the invention, it should be possibly to largely suppress and/or regulate the mixing. This can be effected by means of adapted supplementary construction measures in the device according to the invention at the potential contact points. Preferred construction measures are reduction of the conduit cross sections and/or extension of the conduit sections and/or introduction of static mixers and/or use of pigs in the gas conduits. Pigs used may be passive pigs, i.e. pigs whose position in the gas conduits of the gas distributor is controlled via the properties of the feed gas streams, for example the pressure or volume flow rate thereof, or actively controlled pigs, i.e. pigs whose position in the gas conduits of the gas distributor is fixed, for example by means of a magnet, irrespective of the properties of the feed streams. Preference is given to using passive pigs.

The permeate streams generated in the membrane separation units of a membrane block may be completely combined to give a permeate gas stream and then removed, processed further or discarded, or partly combined, which affords multiple permeate gas streams that are then removed, processed further or discarded independently, or partly combined, which affords one or more permeate gas stream(s) that is/are then independently removed, processed further or discarded, and to some degree individually removed, processed further or discarded, or all individually removed, processed further or discarded.

Preference is given to combining the permeate gas streams in such a way that the resultant number of permeate gas streams corresponds to the number of feed gas streams, and the composition of the permeate gas streams has a maximum degree of difference. More preferably, all permeate gas streams from the membrane separation units of a membrane block that have been supplied with an identical feed gas stream are combined. This leads to a maximum degree of difference in permeate gas streams, as will be shown in Example 1. If some membrane separation units of a membrane block are supplied with mixed gas streams formed from different feed gas streams, the permeate streams obtained in these membrane separation units are preferably divided, and the substreams are each combined with one of the above-described permeate gas streams that were obtained from the membrane separation units that have been supplied with a pure feed gas stream, as will be shown in Example 2.

The procedure with the retentate streams may be analogous. This leads to a very high flexibility of the apparatus according to the invention and of the method with regard to the gas streams obtained from a single system.

Preferred configurations of the device according to the invention and the method, and the general basic principle according to the invention, are elucidated in detail hereinafter with reference to the specific embodiments according to FIGS. 1 to 11.

In a first preferred embodiment, the membrane separation stage according to the invention compreises one membrane block (1) or multiple membrane blocks (1), each having a distributor conduit (4) with multiple branches (5) and supply conduits (6), where in each case a supply conduit (6) connects in each case a branch (5) to a gas inlet (3) of a membrane separation unit (2), and the first feed gas conduit (7) and second feed gas conduit (8) are connected separately and independently to the distributor conduit(s) (4) and/or branches (5), preferably at points with maximum distance from one another in terms of the flow pathway, more preferably to the respective opposite ends of the distributor conduit(s) (4).

One example of this first preferred embodiment of the device according to the invention or of the method is shown in FIG. 1. This comprises a membrane block (1) comprising multiple parallel-connected membrane separation units ($\mathbf{2}_1$) to ($\mathbf{2}_n$), where the index n corresponds to the serial number and the number n to the number of parallel-connected membrane separation units of the membrane block (1), each with a gas inlet ($\mathbf{3}_1$) to ($\mathbf{3}_n$). The gas inlets ($\mathbf{3}_1$) to ($\mathbf{3}_n$) of the membrane separation units ($\mathbf{2}_1$) to ($\mathbf{2}_n$) are connected to one another by means of a gas distributor according to the invention.

The gas distributor comprises a distributor conduit (4) having multiple branches (5), supply conduits ($6_1$) to ($6_n$) that connect the respective branches (5) to the gas inlets ($3_1$) to ($3_n$) of the membrane separation units ($2_1$) to ($2_n$), and is configured in FIG. 1 in such a way that the first feed gas conduit (7) and the second feed gas conduit (8) are separately connected to the respective opposite ends of the distributor conduit (4).

As a modification of FIG. 1, the first feed gas conduit (7) and/or the second feed gas conduit (8) may also be connected separately at a different point to the distributor conduit (4) or a branch (5), with the attachment points preferably having a maximum distance from one another in terms of the flow pathway. More preferably, the first feed gas conduit (7) and/or the second feed gas conduit (8) are each connected to one end of the distributor conduit (4).

If the method according to the invention is executed in a device according to FIG. 1, in the membrane block (1) according to the invention, the first and second feed gas streams of different composition flow towards each other and meet in the distributor conduit (4). Only at the point where the two gas streams meet does mixing of the gas streams take place.

For illustration of the basic principle according to the invention, the example that follows is considered under simplifying assumptions. The main simplifying assumptions include:

a symmetric and identical construction of all repeating apparatus sections the pressure drop in the flow through the two different feed gas streams does not depend on density, viscosity and temperature the pressure-side pressure drop for all membrane separation units is identical In this example, the two gas streams meet in the middle of the distributor conduit (4) at the same pressure and volume flow rate of the first and second feed gas streams. This means that the first feed gas stream is supplied to the membrane separation units ($2_1$) and ($2_2$), where it is separated into retentate streams and permeate streams. Correspondingly, the second feed gas stream is supplied to the membrane separation units ($2_{n-1}$) and ($2_n$), where it is separated into retentate streams and permeate streams that differ in terms of their composition from the permeate and retentate gas streams that are produced in the membrane separation units ($2_1$) and ($2_2$). Further membrane separation units disposed in the middle of the membrane block (1) are optionally supplied with a mixture of the first and second feed gas stream. If there is then a drop, for example, in the pressure or the volume flow rate of the first feed gas stream, the meeting point for the two feed gas streams in the distributor conduit (4) moves in the direction of the end of the distributor conduit at which the first feed gas stream is supplied. As a result, more membrane separation units are now supplied with the second feed gas stream and fewer membrane separation units with the first feed gas stream.

Preferably, reduction of the conduit cross sections and/or extension of the conduit sections of the distributor conduit (4) and/or introduction of static mixers and/or use of pigs between the different gas streams in the distributor conduit (4) prevents, or reduces to the desired degree, the mixing of the feed gas streams at potential contact points thereof. Preference is given to using passive pigs.

The retentate streams from the membrane separation units ($2_1$) to ($2_n$), in the method and the device according to FIG. 1, are supplied to a retentate gas collection pipe (11) in retentate gas conduits ($9_1$) to ($9_n$). At its first end disposed close to membrane separation unit ($2_1$), by means of an appropriately adjusted withdrawal volume, a first retentate gas stream enriched mainly with the retentate gas of the first feed gas stream is obtained, which is supplied to a first retentate gas discharge conduit (12). At the second end of the retentate gas collection pipe (11) disposed close to the membrane separation unit ($2_n$), a second retentate gas stream enriched mainly with the retentate gas of the second feed gas stream is obtained, which is supplied to a second retentate gas discharge conduit (13).

Analogously, the permeate streams from the membrane separation units ($2_1$) to ($2_n$) are supplied to a permeate gas collection pipe (14) in permeate gas conduits ($10_1$) to ($10_n$) in the membrane block (1) in FIG. 1. At its first end disposed close to membrane separation unit ($2_1$), by means of appropriately adjusted withdrawal volumes, a first permeate gas stream enriched mainly with the permeate gas of the first feed gas stream is obtained, which is supplied to the first permeate gas discharge conduit (15). At the second end of the permeate gas collection pipe (14) disposed close to membrane separation unit ($2_n$), a second permeate gas stream enriched mainly with the permeate gas of the second feed gas stream is obtained, which is supplied to the second permeate gas discharge conduit (16).

Similarly to the manner in the distributor conduit (4), it is also possible in the retentate collection pipe (11) to implement supplementary measures at the potential contact points of the retentate streams from the various membrane separation units, especially at the contact point at which the retentate streams enriched mainly with the retentate gas of the first feed gas stream meet the retentate streams enriched mainly with the retentate gas of the second feed gas stream, in order to minimize or prevent mixing of the respective streams or to establish the appropriate withdrawal volumes. Adapted measures would be reduction of the conduit cross sections and/or extension of the conduit sections and/or use of pigs, preference being given here to using actively controlled pigs.

Analogously, it is also possible in the permeate collection pipe (14) to implement supplementary measures at the potential contact points of the permeate streams from the various membrane separation units, especially at the contact point at which the permeate streams enriched mainly with the permeate gas of the first feed gas stream meet the permeate streams enriched mainly with the permeate gas of the second feed gas stream, in order to minimize or prevent mixing of the respective streams or to establish the appropriate withdrawal volumes. Adapted measures would be reduction of the conduit cross sections and/or extension of the conduit sections and/or use of pigs, preference being given here to using actively controlled pigs.

The adjustment of the withdrawal volumes in the permeate or retentate streams can also be effected, for example, via appropriate valves in the retentate gas conduits (9) and/or the permeate gas conduits (10) and/or the retentate collection pipe (11) and/or the permeate collection pipe (14) and/or the first retentate gas discharge conduit (12) and/or the second retentate gas discharge conduit (13) and/or the first permeate gas discharge conduit (15) and/or second permeate gas discharge conduits (16) and/or, in the embodiment according to FIG. 3 described further down, the retentate connection conduits (32) and/or the permeate connection conduits (33). Preferably, for this purpose, valves are used in each case in one permeate gas discharge conduit and all retentate gas discharge conduits or more preferably in all permeate and all retentate gas discharge conduits. Very particular preference is given to using, for this purpose, controllable valves in all permeate and all retentate gas discharge conduits.

In a second preferred embodiment, the membrane separation stage according to the invention contains one membrane block (1) or multiple membrane blocks each having multiple connection conduits (18) that each connect the gas inlet (3) of a membrane separation unit (2) to the gas inlet(s) (3) of the adjacent membrane separation unit(s) (2) in the membrane block (1), and the first feed gas conduit (7) and the second feed gas conduit (8) are each separately and independently connected to one gas inlet (3) of a membrane separation unit (2) or multiple gas inlets (3) of membrane separation units (2) and/or to one connection conduit (18) or multiple connection conduits (18).

One example of this second preferred embodiment of the device according to the invention or of the method is shown in FIG. 2. The membrane block (1) shown therein comprises multiple parallel-connected membrane separation units ($2_1$) to ($2_n$), where the index n corresponds to the serial number and the number n to the number of parallel-connected membrane separation units of the membrane block (1), each with a gas inlet ($3_1$) to ($3_n$). The membrane separation units ($2_1$) to ($2_n$) are connected to one another by means of a gas distributor according to the invention.

In the device or the method according to FIG. 2, the gas distributor comprises connection conduits (18) that each connect the gas inlet (3) of a membrane separation unit (2) to the gas inlets (3) of both adjacent membrane separation units, and in the case of the membrane separation units ($2_1$) and ($2_n$) disposed at the respective ends of a membrane block (1), to the gas inlet (3) of an adjacent membrane separation unit in each case. The feed gas conduit (7) in FIG. 2 is attached to gas inlet ($3_1$), and the feed gas conduit (8) to gas inlet ($3_n$). The first and second feed gas streams are distributed from that point through the connection conduits (18), merging with one another, to the membrane separation units disposed between the membrane separation units ($2_1$) and ($2_n$).

In terms of its function, the membrane block according to FIG. 2 corresponds to the membrane block from FIG. 1, with the difference that the branches (5) in the device from FIG. 1 are integrated into the gas inlets (3) in FIG. 2. Preferably, in the embodiment according to FIG. 2, the branches (5), feed conduit (6) and gas inlets (3) that are executed as independent components in FIG. 1 are constructed as part of the pressure housing of the respective membrane separation unit. The elucidations relating to the basic principle according to the invention in respect of FIG. 1 are thus also analogously applicable to the embodiment according to FIG. 2.

The embodiment according to FIG. 2 may be modified within the scope of the present invention. For example, it is possible to attach feed gas conduit (7) and/or feed gas conduit (8) not to the gas inlets ($3_1$) and ($3_n$) of the membrane separation units ($2_1$) and ($2_n$), but instead to gas inlets of membrane separation units disposed in between, for example to the gas inlets ($3_2$) and/or ($3_{n-1}$). The first feed gas stream in this case would be passed onward via one connection conduit (18) from the gas inlet ($3_2$) to the gas inlet ($3_1$) of the membrane separation unit ($2_1$), and via another connection conduit (18) to the gas inlet ($3_3$) of the membrane separation unit ($2_3$). In this embodiment, the first feed gas stream would thus in any case be separated in membrane separation units ($2_1$) and ($2_2$).

A further inventive modification of the embodiment according to FIG. 2 is configured such that feed gas conduit (7) and/or feed gas conduit (8) are not attached to the gas inlets ($3_1$) or ($3_n$) of the membrane separation units ($2_1$) and ($2_n$), but rather one or both feed gas conduit(s) are attached to connection conduit (18); for example, it is possible to attach feed gas conduit (7) to the connection conduit (18) between the gas inlets of the membrane separation units ($2_1$) and/or ($2_1$).

Preference is given in accordance with the invention to embodiments of the apparatus and of the method that produce a minimum level of mixing of the feed streams, in order to charge the individual membrane unit in each case with the respective feed streams as close as possible to the original composition. Preferably, therefore, at potential contact points of the feed gas streams, reduction of the conduit cross sections and/or extension of the conduit sections of the connection conduit (18) and/or introduction of static mixers and/or use of pigs between the different gas streams in the connection conduit (18) stops the mixing of the feed gas streams, or reduces it to the desired degree. Preference is given to using passive pigs.

The retentate- and permeate-side configuration of the device according to the invention as per FIG. 2, i.e. the inventive further processing of the retentate and permeate streams, is effected analogously to the manner described for FIG. 1.

Further modifications are easily discoverable by the person skilled in the art applying the principle according to the invention.

The device according to the invention and the method therefore more preferably comprise a membrane block (1) comprising a gas distributor, where the gas distributor in the respective membrane block (1) comprises connection conduits (18) that each connect a gas inlet (3) of a membrane separation unit (2) to the gas inlet(s) (3) of the adjacent membrane separation unit(s) (2) in the membrane block (1). The feed gas conduits are each separately and independently connected to one gas inlet (3) of a membrane separation unit (2) or multiple gas inlets (3) of membrane separation units (2) and/or to one connection conduit (18) or multiple connection conduits (18). Preferably, via the connection conduits, the two feed gas streams are then supplied while flow towards each other to the individual membrane separation units.

In addition, it is advantageous and desirable to avoid an excessively high pressure drop in the gas distributor. Finally, very low apparatus complexity and operational complexity is advantageous for the control and regulation of the system. The embodiments according to FIGS. 1 and 2 have all these advantages and are therefore particularly preferred.

In a further preferred embodiment according to the invention, the principle of combining branches (5) and feed conduits (6) elucidated above using the example of FIG. 2 is applied to the retentate processing system and/or permeate processing system. Rather than, as shown in FIGS. 1 and 2, connecting the retentate streams from the membrane separation units (2) of a membrane block (1) to a retentate gas collection pipe (11) via retentate gas conduits (9), in this embodiment, the retentate gas outlets (30) of the membrane separation units (2) are connected by retentate connection conduits (32). The retentate gas discharge conduits (12) and (13) are attached to a retentate gas outlet (30) or to a retentate connection conduit (32). Preferably, the retentate gas discharge conduits (12) are attached to the retentate gas outlet ($30_1$) or, in construction terms, to a retentate gas outlet or a retentate connection conduit in the vicinity thereof, and the retentate gas discharge conduits (13) are attached to the retentate gas outlet (30$_n$) or, in construction terms, to a retentate gas outlet or a retentate connection conduit in the vicinity thereof. A corresponding embodiment in combination with the gas distribution system according to FIG. 2 is shown in FIG. 3. Analogously, the retentate processing system according to FIG. 3 can alternatively be combined with a gas distribution system according to FIG. 1.

It is also possible to proceed analogously with the permeate processing system as described above for the retentate processing system. Both embodiments with retentate collection pipe and permeate collection pipe in a membrane block and with retentate connection conduits and permeate connection conduits in a membrane block and with retentate collection conduit and permeate connection conduits in a membrane block and with retentate connection conduit and permeate collection conduit in a membrane block are encompassed by the present invention. Also encompassed by the present invention and readily discoverable by a person skilled in the art are combinations of the embodiments in which, for example, a portion of the retentate gases from a membrane block is supplied to a retentate collection conduit and another is removed via retentate connection conduits. The same applies to corresponding combinations for the permeate streams in the membrane block.

The above-described devices according to the invention and preferred configurations thereof may be scaled in that the number "n" of parallel-connected membrane separation units (2) in a membrane block (1) is increased or reduced. Thus, without changing the membrane separation units themselves, it is possible to adjust the separation capacity of each membrane block (1) and hence each membrane separation stage.

Alternatively or additively, it is also possible to vary the membrane separation units themselves, for example by adjusting the membrane separation area and/or the selectivity of the membranes and/or the permeability of the membranes.

It is additionally possible to use different membranes in the membrane separation units (2) in one membrane block (1). According to the composition of the feed gas streams to be separated, it may be advisable to use membranes optimized for a first feed gas stream in the membrane separation units in which exclusively or mainly the first feed gas stream is separated, and to use membranes optimized for a second feed gas stream in the separation stages in which exclusively or mainly the second feed gas stream is separated.

Since the gas distributor according to the invention—as described above—controls the supply of the feed gas streams or mixtures thereof to the individual separation stages, preferably depending on properties of the feed gas streams, for example depending on the current volume flow rate and/or mass flow rate and/or pressure of the respective feed gas stream, it may be the case that membrane separation units, at some juncture of the operation of the device or of the method, are supplied with a gas mixture having the first feed gas stream as its main constituent and, at a later juncture, with a gas mixture having the second feed gas stream as its main constituent. It is therefore preferable to use the same membranes in all membrane separation units (2) of a separation stage (1).

Alternatively or additively, it is possible to adjust the capacity and the selectivity of the membrane separation units via the operating temperature. In a preferred execution, the feed gas streams have different inlet temperatures. Controlled regulation of the operating temperature can be utilized, for example, for achievement of specification values with regard to the composition of one or more retentate gases and/or permeate gases or the yield of at least one gas component.

A further preferred embodiment for adjustment of the separation capacity of a membrane separation stage according to the invention is shown in FIGS. 4 and 5. Here, in a membrane separation stage, membrane blocks (1) connected in parallel are used in each case. All the membrane blocks described above may be used here. The use of multiple parallel-connected membrane blocks rather than an enlargement of the membrane blocks themselves, i.e. the use of four membrane blocks each having 10 membrane separation units rather than one block having 40 parallel-connected membrane separation units, has benefits with regard to pressure control, especially avoidance of pressure drops, and to a simplified rack design.

FIG. 4 uses "o" membrane blocks (1) according to FIG. 1, connected in parallel, with the index (o) indicating the number of membrane blocks (1) connected in parallel. These respective membrane blocks (1$_1$) to (1$_o$) each have distributor conduits (4$_1$) to (4$_o$). The ends of the distributor conduits (4$_1$) to (4$_o$) disposed towards the membrane separation units (2$_1$) of the respective membrane blocks are connected to one another by gas conduit (19*a*). The ends of the distributor conduits (4$_1$) to (4$_o$) disposed towards the membrane separation units (2$_n$) of the respective membrane blocks are likewise each connected to one another by gas conduit (19*b*). FIG. 4 shows, by way of simplification, merely the feed gas conduits (7) and (8), the distributor conduits (4$_1$) to (4$_o$) and the branches (5) in the respective distributor conduits. Supply conduits (6) emanate from each of the branches (5), as shown in FIG. 1 for the individual membrane separation units (2). The permeate and retentate processing systems that are likewise not shown in FIG. 4 are preferably executed as elucidated further up, more preferably as shown in any of FIGS. 1 to 3.

The feed gas streams may be supplied in different ways, as shown in FIG. 4 in a nonexhaustive presentation of options, represented by such an interconnection of membrane blocks.

FIG. 4*a* shows an interconnection and a method in which the first feed gas conduit (7) is connected to the gas conduit (19*a*) towards membrane separation unit (2$_1$) of the first membrane block (1$_1$), and the second feed gas conduit (8) is connected to the gas conduit (19*b*) towards membrane separation unit (2$_n$) of the last membrane block (1$_o$).

FIG. 4*b* shows an interconnection and a method in which the first feed gas conduit (7) is connected to the gas conduit (19*a*) towards membrane separation unit (2$_1$) of the first membrane block (1$_1$), and the second feed gas conduit (8) is connected to the gas conduit (19*b*) towards membrane separation unit (2$_n$) of the first membrane block (1$_1$).

FIG. 4*c* shows an interconnection in which the first feed gas conduit (7) is connected to the gas conduit (19*a*) disposed towards membrane separation unit (2$_1$), and the second feed gas conduit (8) opposite it, i.e. to the gas conduit (19*b*) disposed towards membrane separation unit (2$_n$), in each case between two membrane blocks.

FIG. 4*d* shows an interconnection in which the first feed gas conduit (7) is disposed in the middle of the distributor conduit (4$_1$) and the second feed gas conduit (8) opposite it, in the middle of the distributor conduit (4$_o$).

In this preferred embodiment, the device according to the invention is more preferably characterized in that the membrane separation stage comprises multiple membrane blocks (1), the gas distributor comprises one distributor conduit (4) with multiple branches (5) and supply conduits (6) per membrane block (1), where in each case a supply conduit (6) connects a branch (5) to a gas inlet (3) of a membrane separation unit (2), the distributor conduits (4) of the respective membrane blocks (1) of the membrane separation stage are connected to one another by means of conduits (19*a*, 19*b*), and the first feed gas conduit (7) and second feed gas conduit (8) are independently connected at spatially separate sites to a distributor conduit (4) or a branch (5) or to a conduit (19*a*, 19*b*), where the attachment points are arranged such that two or more than two branches (5) and/or two or more than two gas inlets (3) are disposed between the attachment points of the first feed gas conduit (7) and the second feed gas conduit (8).

In FIG. 5, "o" membrane blocks according to FIG. 2 that are connected in parallel are used. The membrane inlets ($\mathbf{3}_1$) of the membrane separation units ($\mathbf{2}_1$) of the respective membrane blocks ($\mathbf{1}_1$) to ($\mathbf{1}_o$) (indicated by dotted ellipses in FIG. 5) are each connected to one another here by gas conduit (20*a*). The membrane inlets ($\mathbf{3}_n$) of the respective membrane blocks ($\mathbf{1}_1$) to ($\mathbf{1}_o$) on the opposite side are likewise each connected to one another by gas conduit (20*b*). FIG. 5 shows, by way of simplification, merely the feed gas conduits (7) and (8), and the connection conduits (18) and the gas inlets (3). The permeate and retentate processing systems that are not shown in FIG. 5 are preferably executed as elucidated further up, more preferably as shown in any of FIGS. 1 to 3.

The feed gas streams may be supplied in different ways, as shown in FIG. 5 in a nonexhaustive presentation of options, represented by such an interconnection of membrane blocks.

FIG. 5*a* shows an interconnection in which the first feed gas conduit (7) is connected to the distributor conduit (20*a*) towards the membrane separation unit ($\mathbf{2}_1$) of the first membrane block ($\mathbf{1}_1$), and the second feed gas conduit (8) is connected to the distributor conduit (20*b*) towards the membrane separation unit ($\mathbf{2}_n$) of the membrane block ($\mathbf{1}_o$).

FIG. 5*b* shows an interconnection in which the first feed gas conduit (7) is connected to the distributor conduit (20*a*) towards the membrane separation unit ($\mathbf{2}_1$) of the first membrane block ($\mathbf{1}_1$), and the second feed gas conduit (8) is connected to the distributor conduit (20*b*) towards the membrane separation unit ($\mathbf{2}_n$) of the first membrane block ($\mathbf{1}_1$).

FIG. 5*c* shows an interconnection in which the first feed gas conduit (7) is connected to the connection conduit (20*a*) and the second feed gas conduit (8) opposite it, i.e. to the connection conduit (20*b*) disposed towards the membrane separation unit ($\mathbf{2}_n$), in each case between two membrane blocks.

FIG. 5*d* shows an interconnection in which the first feed gas conduit (7) is connected to a connection conduit (18) of the first membrane block ($\mathbf{1}_1$) and the second feed gas conduit (8) opposite it, to a connection conduit (18) of the membrane block ($\mathbf{1}_o$).

In this preferred embodiment, the device according to the invention is more preferably characterized in that the membrane separation stage comprises multiple membrane blocks (1), the gas distributor in the respective membrane block (1) comprises connection conduits (18) that each connect the gas inlet (3) of a membrane separation unit (2) to the gas inlet(s) (3) of the adjacent membrane separation unit(s) (2) in the membrane block (1), the membrane blocks (1) of the membrane separation stage are connected to one another by means of conduits (20*a*, 20*b*), where the conduits (20*a*, 20*b*) in the respective membrane block are each connected to one or more connection conduit(s) (18) and/or one or more gas inlet(s) (3), preferably where the conduit (20*a*) in the respective membrane block (1) is connected to a connection conduit (18) or a gas inlet (3) and the conduit (20*b*) in the respective membrane block is connected to a different connection conduit (18) or a different gas inlet (3), and the first feed gas conduit (7) and the second feed gas conduit (8) are independently connected at spatially separate sites to one or more connection conduit(s) (18) or to one to more conduit(s) (20*a*, 20*b*), or to one or more gas inlet(s) (3), where the attachment points are arranged such that two or more than two gas inlets (3) are disposed between the attachment points of the first feed gas conduit (7) and the second feed gas conduit (8).

An inventive extension of the embodiment according to FIG. 5 is shown in FIG. 6. By way of supplementation of FIG. 5, not only are the gas inlets ($\mathbf{3}_1$) and ($\mathbf{3}_n$) of the membrane blocks ($\mathbf{1}_1$) to ($\mathbf{1}_o$) each connected to one another by the gas conduits (20*a*) and (20*b*) here, but the gas inlets ($\mathbf{3}_2$) to ($\mathbf{3}_{n-1}$) of the membrane blocks ($\mathbf{1}_1$) to ($\mathbf{1}_o$) are also connected to one another by further gas conduits (20) at the level of the membrane separation units to give a "full lattice".

The device according to the invention for separation of gases is not limited to the simultaneous separation of two feed gas streams having different composition. The principle according to the invention can also be extended to multiple feed gas streams.

The device according to the invention preferably comprises one, two or three additional feed gas conduit(s) three (21), four and five, where the feed gas conduits three (21), four and five are adapted for transporting one, two or three additional gas streams of different composition from the first and second feed gas streams and where the additional feed gas conduit(s) three (21), four and five are connected to the gas distributor such that gas streams three (21) or three (21) and four or three (21), four and five can be supplied to the membrane separation units by means of the gas distributor.

In a first preferred embodiment, the additional feed gas conduits are attached to one or more distributor conduit(s) (4), preferably between the attachments of the feed gas conduits (7) and (8). One example of such a configuration with an additional third feed gas conduit (21) is shown in FIG. 7*a*).

In a second and third preferred embodiment, the additional feed gas conduits are attached to one or more connection conduit(s) (18) and/or one or more gas inlet(s) (3). The connection site(s) is/are preferably disposed at one or more connection conduit(s) (18) and/or gas inlet(s) (3) other than the gas inlets (3) to which the first feed gas conduit (7) and the second feed gas conduit (8) are attached, which is/are disposed between the attachments of the first feed gas conduit (7) and the second feed gas conduit (8). More preferably, the additional feed gas conduit(s) is/are attached to one of the gas inlets ($\mathbf{3}_2$) to ($\mathbf{3}_{n-1}$) or to a connection conduit (18) disposed in between. Examples of such embodiments with an additional third feed gas conduit ($\mathbf{2}_1$) are shown in FIGS. 7*b*) and 7*c*).

In further preferred embodiments, multiple membrane blocks (1) according to the invention to which two feed gas conduits in each case through which feed gases having different composition flow are attached are combined with one another.

In a preferred embodiment, the membrane blocks may be combined, i.e. interconnected, in a linear manner, and each membrane block (1$_1$) to (1$_o$), where o corresponds to the serial number of the respective membrane block, is supplied with two feed gas streams. An example of such a device is shown in FIG. 8. Here, the feed gas conduits (7) and (8) are connected to the distributor conduit (4$_1$) of a first membrane block (1$_1$). This first membrane block (1$_1$) is combined with a second membrane block (1$_2$), with the feed gas conduits (8) and (21) being connected to the distributor conduit (4$_2$) of the second membrane block (1$_2$). Such a system can be extended as desired for further feed gas streams.

In a likewise preferred, alternative embodiment, it is possible to combine, i.e. interconnect, multiple membrane blocks (1$_1$) to (1$_o$) according to the invention to form a ring circuit, in which case preferably each membrane block (1$_1$) to (1$_o$) is connected to two feed gas conduits. An example of such an arrangement is shown in FIG. 9. Here, three membrane blocks (1$_1$), (1$_2$) and (1$_3$) are combined with the distributor conduits (4$_1$), (4$_2$) and (4$_3$) to form a ring circuit. The distributor conduit (4$_1$) connects the feed gas conduits (7) and (8), the distributor conduit (4$_2$) the feed gas conduits (7) and (21), and the distributor conduit (4$_3$) the feed gas conduits (8) and (21). Such ring circuits can be extended by further membrane blocks according to the invention, for example to form a quadruple or quintuple interconnection.

It is likewise possible to combine the embodiments from FIGS. 7 to 9 with one another. For example, it would be possible in the ring circuit from FIG. 9 to supply a fourth feed gas conduit to the distributor conduit (4$_1$) between the attachments of feed gas conduits (7) and (8).

FIGS. 7, 8 and 9 show, by way of simplification, merely the feed gas conduits (7), (8) and (21), and the distributor conduits (4$_1$) to (4$_3$) and the branches (5). Supply conduits emanate from each of the branches, as shown in FIG. 1, for the individual membrane separation units. The permeate and retentate processing systems that are likewise not shown in FIGS. 7, 8 and 9 are preferably executed as elucidated further up, more preferably as shown in any of FIGS. 1 to 3, and connected to one another analogously to the distributor conduits.

The embodiments of FIGS. 8 and 9 may of course also be executed with membrane blocks from FIGS. 2 and 3, i.e., for example, with multiple connection conduits (18) per membrane block. Corresponding configurations can be easily inferred by a person skilled in the art from the above-described teaching according to the invention.

The device according to the invention and the method may, in the above-described general embodiments, but also in all preferred embodiments, comprise one or more valves or other control devices with which the gas supply to the individual gas inlets of the membrane separation units can be controlled or influenced in one or more distributor conduit(s) and/or in one or more supply conduit(s) and/or in one or more connection conduit(s).

The device may, for example, be controlled or configured by means of the valves or the other control devices such that one or more membrane separation units can be switched on or off in the event of a change in the gas volume supplied in the feed gas conduit.

Valves used may be shutoff valves and/or needle valves. The gas flow in the gas distribution system can alternatively be influenced and/or controlled by means of other regulators such as reductions, e.g. aperture plates.

Especially in the embodiments with distributor conduits and/or connection conduits, the distribution system according to the invention, by virtue of the feed streams merging into one another, can largely to completely self-regulate, for example via the volume flow rate and/or mass flow rate and/or the pressure of the feed gas streams, without having to use controllable valves within a membrane block. By comparison with a gas distributor controlled purely by means of valves, the number of costly controllable valves can thus be reduced very significantly; preferably, the device according to the invention therefore contains valves for control of the gas streams only in a single one or most preferably in none of the distribution conduit(s) and/or feed conduit(s) and/or connection conduit(s). In a likewise preferred embodiment, however, the membrane separation units do contain simple manual valves in order, in the event of damage, to separate a defective membrane rapidly from the rest of the membranes.

The permeate and retentate streams obtained in the membrane blocks according to the invention are preferably, as shown in FIGS. 1 to 3, each supplied to a permeate processing system and a retentate processing system for each membrane block. The permeate and retentate processing systems may, as shown in FIGS. 1 and 2, comprise retentate and/or permeate collection pipes. Alternatively, they may, as shown in FIG. 3, contain retentate and/or permeate connection conduits between the retentate or permeate outlets of the respective membrane separation units of the respective membrane blocks. Combinations, for example the use of retentate connection conduits and permeate collection tubes, as shown in FIG. 3, are likewise possible.

Via the retentate and/or permeate collection pipes and/or the retentate and/or permeate connection conduits, the retentate or permeate streams are supplied to outflow conduits. In a first preferred embodiment, two points, preferably two points as far removed as possible from one another, more preferably both ends of a collection pipe, are connected to outflow conduits, as shown in FIGS. 1 and 2. This enables removal of permeate or retentate streams consisting mainly of the permeate or retentate gas of the first feed stream from the outflow conduits disposed close to the membrane separation unit (2$_1$). By means of the outflow conduits disposed close to the membrane separation unit (2$_n$), it is possible to remove permeate or retentate streams consisting mainly of the permeate or retentate gas of the second feed stream. The same technical effects can be achieved when retentate or permeate connection conduits are used in place of retentate or permeate collection pipes. In this case, preference is given to attaching an outflow conduit close to the retentate gas outlet (30$_1$) of the membrane separation unit (2$_1$) to a retentate gas outlet of a membrane separation unit or to a connection conduit, and a second outflow conduit close to the retentate gas outlet (30$_n$) of the membrane separation unit (2$_n$) to a gas outlet of a membrane separation unit or to a connection conduit. Correspondingly analogous configurations, for example for the permeate streams, are easily executed by a person skilled in the art.

Further discharge conduits may be attached, for example, in the middle of the retentate or permeate collection pipes or, when retentate or permeate connection conduits are used, to a connection conduit or a gas outlet of the membrane separation units (2$_2$) or (2$_{n-1}$), in order, for example, to obtain permeate or retentate streams consisting essentially of a mixture of the permeate or retentate gases of the first and second feed streams. Such further outflow conduits are preferably, if anything, attached in the middle region of membrane blocks (1).

The adjustment of the withdrawal volumes in the permeate or retentate streams can also be effected, for example, via appropriate valves in the retentate gas conduits (9) and/or the permeate gas conduits (10) and/or the retentate collection pipe (11) and/or the permeate collection pipe (14) and/or the first retentate gas discharge conduit (12) and/or the second retentate gas discharge conduit (13) and/or the first permeate gas discharge conduit (15) and/or the second permeate gas discharge conduit (16) and/or, in the embodiment according to FIG. 3, the retentate connection conduits (32) and/or permeate connection conduits (33). Preferably, for this purpose, valves are used in each case in one permeate gas discharge conduit and all retentate gas discharge conduits or more preferably in all permeate and all retentate gas discharge conduits. Very particular preference is given to using, for this purpose, controllable valves in all permeate and all retentate gas discharge conduits.

In an alternative, likewise preferred embodiment, it is also possible that the permeate collection pipe or retentate collection pipe is connected to an discharge conduit at just one point. In this case, all permeate or retentate streams are combined in the respective collection pipe and withdrawn from the system as in each case a combined mixed stream. The same technical effects can be achieved when retentate or permeate connection conduits are used in place of retentate or permeate collection pipes. In this case, the one outflow conduit is attached to a retentate or permeate connection conduit or to a retentate or permeate outlet of a membrane separation unit of a membrane block. Corresponding configurations can easily be executed by a person skilled in the art. It is likewise possible to connect multiple retentate or permeate discharge conduits to form one conduit in order to achieve the same technical effect.

In a further, alternative, likewise preferred embodiment, it is also possible that the permeate collection pipe and retentate collection pipe are each connected to an discharge conduit at just one point. In this case, all permeate or retentate streams are combined in the respective collection pipe and withdrawn from the system as a combined mixed stream. The same technical effects can be achieved when retentate or permeate connection conduits are used in place of retentate or permeate collection pipes. In this case, the one discharge conduit is attached to a retentate or permeate connection conduit or to a retentate or permeate outlet of a membrane separation unit ($\mathbf{2}_1$) of a membrane block.

Corresponding configurations can easily be executed by a person skilled in the art. It is likewise possible to connect multiple retentate or permeate outflow conduits to form one conduit in order to achieve the same technical effect.

More preferably, in the devices and methods according to the invention, retentate streams, preferably all retentate streams, from the membrane separation units (2) of a membrane block (1) are supplied with the aid of retentate gas conduits (9) to a retentate gas collection pipe (11), where the retentate gas collection pipe (11) is connected to at least a first retentate gas discharge conduit (12), preferably at least two retentate gas discharge conduits (12) and (13), through which one or more retentate gas streams are removed from the membrane separation stage in which they were generated, and/or permeate streams, preferably all permeate streams, from the membrane separation units (2) of a membrane block (1) are supplied with the aid of permeate gas conduits (10) to a permeate gas collection pipe (14), where the permeate gas collection pipe (14) is connected to at least a first permeate gas discharge conduit (15), preferably at least two permeate gas discharge conduits (15) and (16), through which one or more permeate gas streams are removed from the membrane separation stage in which they were generated.

Likewise more preferably, in the devices and methods according to the invention, retentate streams, preferably all retentate streams, from the membrane separation units of a membrane block are supplied, with the aid of retentate connection conduits between the retentate gas outlets, to one or more retentate outflow conduits, through which one or more retentate gas streams are removed from the membrane block, where the device in this case comprises retentate connection conduits (32) between the retentate gas outlets (30) of the membrane separation units (2) of a membrane block (1) of the membrane separation stage, where at least one retentate connection conduit (32) or at least one retentate gas outlet (30) is additionally connected to at least one retentate gas discharge conduit (12), it being preferable that one or more retentate connection conduit(s) (32) and/or one or more retentate gas outlet(s) (30) are connected to two retentate gas discharge conduits (12) and (13) in a membrane block (1) of the membrane separation stage, and/or permeate streams, preferably all permeate streams, from the membrane separation units of a membrane block are supplied with the aid of permeate connection conduits between the permeate gas outlets to one or more permeate outflow conduits, through which one or more permeate gas streams are removed from the membrane block, where the device in this case comprises permeate connection conduits (33) between the permeate gas outlets (31) of the membrane separation units (2) of a membrane block (1) of the membrane separation stage, where at least one permeate connection conduit (33) or at least one permeate gas outlet (31) is connected to at least one permeate gas discharge conduit (15), it being preferable that one or more permeate connection conduit(s) (33) and/or one or more permeate gas outlet(s) (31) are connected to two permeate gas discharge conduits (15) and (16) in a membrane block (1) of the membrane separation stage.

If membrane separation stages having multiple membrane blocks are used in the device according to the invention or in the method according to the invention, the permeate and retentate streams from the respective membrane blocks of a membrane separation stage are preferably combined to give one or two permeate streams or one or two retentate streams per membrane separation stage. Preference is given here to combining all the first retentate streams obtained in the first retentate gas discharge conduit (12) of the respective membrane blocks (1) to give a first retentate stream from the membrane separation stage.

If, in the membrane blocks (1), second retentate streams are also obtained in the second retentate gas discharge conduit (13) from the respective membrane blocks (1), these second retentate streams are preferably combined to give a second retentate stream from the membrane separation stage. It is possible to proceed analogously when further retentate streams are obtained in the respective membrane blocks.

It is preferable to proceed analogously with the permeate streams from the respective membrane blocks (1) from a membrane separation stage as described above for the retentate streams.

The permeate and retentate streams obtained from a membrane separation stage according to the invention may be withdrawn as product stream, processed further or discarded, although at least one permeate stream and/or retentate stream is withdrawn as product stream or processed further. More preferably, at least two permeate streams or at least two retentate streams are generated in each membrane separation stage, at least one of which is withdrawn as product stream or processed further.

The device according to the invention may comprise a membrane separation stage or else multiple interconnected membrane separation stages according to the invention, although at least one membrane separation stage according to the invention comprising one membrane block (1) or multiple membrane blocks (1), each of which in turn comprises multiple membrane separation units (2) connected in parallel, together with a gas distributor according to the invention configured such that it comprises connection conduits (18) that each connect the gas inlets (3) of two adjacent membrane separation units (2) of a membrane block (1) directly and immediately to one another, and/or one or more distributor conduit(s) (4) containing one or more branch(es) (5) that are each connected by means of a separate supply conduit (6) to a gas inlet (3) of a membrane separation unit (2) of a membrane block (1), wherein one or more branch(es) (5) may additionally also have an attachment means for a feed gas conduit, such that, by means of the branch(es) (5), a feed gas conduit and a supply conduit (6) may simultaneously be connected to the respective distributor conduit (4), if the membrane separation stage comprises multiple membrane blocks (1), it comprises conduits, preferably conduits (19*a*, 19*b*, 20*a*, 20*b*) that connect the membrane blocks (1) of the membrane separation stage to one another, the first feed gas conduit (7) and the second feed gas conduit (8) are independently connected at spatially separate sites to a distributor conduit (4) or a connection conduit (18) or a branch (5) or, if present, to a conduit, preferably a conduit (19*a*, 19*b*, 20*a* or 20*b*), or to a gas inlet (3), where the attachment points are arranged such that two or more than two branches (5) and/or two or more than two gas inlets (3) are disposed between the attachment points of the first feed gas conduit (7) and the second feed gas conduit (8), is used.

The present invention also encompasses embodiments in which multiple membrane separation stages according to the invention are interconnected.

For instance, FIG. 10 shows a 2-stage interconnection in which two inventive membrane separation stages A and B are interconnected on the retentate side. In the device according to FIG. 10, two feed gas streams of different composition are supplied by means of feed gas conduits (7) and (8) of the first membrane separation stage A, which is preferably configured as shown in FIG. 1 and as described further up. The two permeate streams obtained from the permeate collection pipe of the first membrane separation stage A, by means of permeate gas discharge conduits (15) and (16), are independently either withdrawn as product streams, processed further or discarded. The two permeate streams may be treated in the same way or may independently be treated differently. The two retentate streams obtained from the retentate collection pipe of the first membrane separation stage A are supplied by means of retentate gas discharge conduits (12) and (13) as new feed streams to the membrane separation stage B. As elucidated above for FIG. 1, the two retentate streams obtained from the retentate collection pipe of the first membrane separation stage differ in their composition. The retentate stream removed in the retentate gas discharge conduit (12) contains mainly the retentate gas of the first feed stream, and the second retentate stream removed in the retentate gas discharge conduit (13) mainly the retentate gas of the second feed stream. The retentate gases in the two retentate streams may be the same or different. If they are the same, the two retentate gas streams will nevertheless differ in terms of content, i.e. in terms of their quantitative composition.

Since the two retentate streams from the membrane separation stage A differ in their composition, the same prerequisite is applicable to the second membrane separation stage B as for the membrane separation stage A, i.e. it is supplied with two feed gas streams, with the second feed gas stream different from the first in terms of its composition. Membrane separation stage B is preferably of the construction as shown in FIG. 1. The two permeate streams obtained from the permeate collection pipe of the second membrane separation stage B, by means of the permeate gas discharge conduits (22) and (23), are recycled to the feed gas conduits (7) and (8). The two retentate streams obtained from the retentate collection pipe of the second membrane separation stage B, by means of the retentate gas discharge conduits (24) and (25), are independently either withdrawn as product streams, processed further or discarded.

For the operation of a membrane separation unit, a partial pressure differential and hence in general a pressure differential between the retentate side and the permeate side are necessary. The pressure on the retentate side must be higher than on the permeate side. This can be ensured, for example, by generating a feed gas stream with an elevated pressure by means of a compressor or by generating a reduced pressure, for example by means of a vacuum pump, on the permeate side of the membrane. Corresponding technologies are known to the person skilled in the art. What this means for the interconnection according to FIG. 10 is that the pressure in the permeate gas discharge conduits (22) and (23) is generally lower than in the feed gas conduits (7) and (8). The recycled permeate streams must therefore be brought to the pressure of the feed streams in the feed gas conduits (7) and (8) in the compression units P1 and P2. The compression units P1 and P2 may be of the same or different configuration. For example, it is possible that a compressor is used in one or both of the permeate gas discharge conduits (22) and/or (23). This configuration will preferably be chosen when one or both of the crude gas streams not shown in FIG. 10 is already under sufficient pressure.

Alternatively, one or both of the permeate streams recycled in the permeate gas discharge conduits (22) and (23), in the compression units P1 and P2, may each be supplied to one of the crude gas streams not shown in FIG. 10, and the resultant mixed stream or the resultant two mixed streams may be condensed, and hence the feed stream or the two feed streams may be generated in the feed gas conduits (7) and/or (8).

In a further alternative, one or both of the permeate streams recycled in the permeate gas discharge conduits (22) and (23), in the compression units P1 and P2, may be supplied directly to a compressor that produces one of the two feed streams in the feed gas conduits (7) and (8).

The two latter alternatives are preferably employed when the crude gas stream(s) has/have a lower pressure than the feed streams.

Alternatively or additionally, the partial pressure differential may also be generated or increased by a purge gas stream on the permeate side. This procedure too is known to the person skilled in the art.

Devices for increasing the pressure in the permeate gas discharge conduits (15) and (16) and/or (22) and (23) are advisable for increasing the driving force, but are less preferred on account of the apparatus complexity.

Alternatively but likewise preferably, it is also possible to configure one or both of the membrane separation stages A and/or B in FIG. 10 as in the other preferred embodiments discussed further up, especially as shown by FIG. 2 or 3.

The interconnection according to FIG. 10 may be varied in various ways. Examples include the following:

the permeate streams obtained from membrane separation stage B may independently be withdrawn as product stream, processed further or discarded, with the condition that at least one of the two permeate streams from the membrane separation stage A or B or the retentate streams from the membrane separation stage B are withdrawn as product stream or processed further, one, preferably both, of the permeate streams obtained from the membrane separation stage B is/are recycled to the respective original feed stream from the membrane separation stage A and, at the same time, the retentate streams obtained from membrane separation stage B are independently withdrawn as product stream, processed further or discarded, with the condition that at least one of the two permeate streams from the membrane separation stage A or the retentate streams from the membrane separation stage B is withdrawn as product stream, both permeate streams obtained from the membrane separation stage A are supplied as feed streams to the second membrane separation stage B, and the two retentate streams obtained from the membrane separation stage A are independently withdrawn as product stream, processed further or discarded.

Further modifications of the 2-stage interconnection are easily discoverable by a person skilled in the art with reference to the teaching according to the invention.

More preferably, the device according to the invention and the method according to the invention are therefore characterized in that they comprise two membrane separation stages A and B, where each of the two membrane separation stages A and B comprises a membrane block (1) or multiple membrane blocks (1) each comprising multiple membrane separation units (2) connected in parallel, and in that the gas distributor of the first membrane separation stage A is configured such that it connects the first feed gas conduit (7) and the second feed gas conduit (8) to the gas inlets (3) of the membrane separation units (2) of the first membrane separation stage A in such a way that, in each membrane block (1) of the membrane separation stage A, at least two different membrane separation units (2) are supplied with gas streams of different composition, the first membrane separation stage A is configured such that two different retentate streams are obtained in a first retentate gas discharge conduit (12) and a second retentate gas discharge conduit (13) and/or two different permeate streams are obtained in a first permeate gas discharge conduit (15) and a second permeate gas discharge conduit (16), the two retentate streams or the two permeate streams from the first membrane separation stage A are supplied to the second membrane separation stage B as feed streams, and the gas distributor of the second membrane separation stage B is configured such that it connects the first retentate gas discharge conduit (12) and the second retentate gas discharge conduit (13) or the first permeate gas discharge conduit (15) and the second permeate gas discharge conduit (16) to the gas inlets (3) of the membrane separation units (2) of the second membrane separation stage B in such a way that, in each membrane block (1) of the second membrane separation stage B, at least two different membrane separation units (2) are supplied with gas streams of different composition.

More preferably, the second membrane separation stage B is configured such that two different retentate streams are obtained in a first retentate gas discharge conduit (24) and a second retentate gas discharge conduit (25) and/or two different permeate streams are obtained in a first permeate gas discharge conduit (22) and a second permeate gas discharge conduit (23).

FIG. 11 shows, as a further particularly preferred embodiment according to the invention, a 3-stage interconnection in which three membrane separation stages according to the invention are interconnected in such a way that the two retentate streams from the membrane separation stage A are supplied as feed streams to the membrane separation stage B, and the two permeate streams from the membrane separation stage A are supplied as feed streams to the membrane separation stage C.

In this case, two feed gas streams of different composition are supplied by means of the feed gas conduits (7) and (8) of the first membrane separation stage A, which is preferably configured as shown in FIG. 1. The two permeate streams obtained from the permeate collection pipe of the first membrane separation stage A are supplied by means of the permeate gas discharge conduits (15) and (16) as new feed gas streams to the membrane separation stage C. The two retentate streams obtained from the retentate collection pipe of the first membrane separation stage A are supplied by means of the retentate gas discharge conduits (12) and (13) as new feed streams to the membrane separation stage B. As elucidated above for FIGS. 1 and 10, the two retentate gas streams obtained from the first membrane separation stage A differ in their composition. The same applies to the permeate gas streams obtained from the first membrane separation stage A.

Since the two retentate streams from the membrane separation stage A differ in their composition, the same prerequisite is applicable to the second membrane separation stage B as for the membrane separation stage A, i.e. it is supplied with two feed gas streams, with the second feed gas stream different from the first in terms of its composition. Membrane separation stage B is preferably of the construction as shown in FIG. 1. The two retentate streams obtained from the retentate collection pipe of the second membrane separation stage B, by means of the retentate gas discharge conduits (24) and (25), are independently either withdrawn as product streams, processed further or discarded. The two permeate streams obtained from the permeate collection pipe of the second membrane separation stage B, by means of the permeate gas discharge conduits (22) and (23), are recycled to the feed gas conduits (7) and (8).

Since the two permeate streams from the membrane separation stage A differ in their composition, the same prerequisite is applicable to the third membrane separation stage C as for the membrane separation stage A, i.e. it is supplied with two feed gas streams, with the second feed gas stream different from the first in terms of its composition. Membrane separation stage C is likewise of the construction as shown in FIG. 1. The two permeate streams obtained from the permeate collection pipe of the third membrane separation stage C, by means of the permeate gas discharge conduits (26) and (27), are independently either withdrawn as product streams, processed further or discarded. The two retentate streams obtained from the retentate collection pipe of the third membrane separation stage C, by means of the retentate gas discharge conduits (28) and (29), are recycled to the feed gas conduits (7) and (8).

Alternatively but likewise preferably, it is also possible to configure one, two or all three membrane separation stages A, B and/or C in FIG. 11 as in the other preferred embodiments discussed further above, especially as shown by FIG. 2 or 3.

For the interconnection according to FIG. 11, the same applies as for FIG. 10, i.e. the pressure in the permeate gas discharge conduits (22) and (23) and in the retentate gas discharge conduits (28) and (29) is lower than in the feed gas conduits (7) and (8). The recycled gas streams must therefore be brought to the pressure of the feed gas streams in the feed gas conduits (7) and (8) in the compression units P1 and P2. The compression units P1 and P2 may be of the same or different configuration.

Thus, the permeate gas discharge conduit (22) is preferably combined with the retentate gas discharge conduit (28) and supplied via a further gas conduit to the compression unit P1. The permeate gas discharge conduit (23) is preferably combined with the retentate gas discharge conduit (29) and supplied via a further gas conduit to the compression unit P2.

A compressor may be disposed in one or both of the gas conduits supplied to the compression units P1 and P2. This configuration will preferably be chosen when one or both of the crude gas streams not shown in FIG. 11 is already under sufficient pressure.

Alternatively, one or both of the gas streams recycled in the gas conduits supplied to the compression units P1 and P2, in compression units P1 and P2, may each be supplied to one of the crude gas streams not shown in FIG. 11, and the resultant mixed stream or the resultant mixed streams may be condensed, and hence the feed stream/the feed streams may be generated in the feed gas conduits (7) and/or (8).

In a further alternative, one or both of the gas streams recycled in the gas conduits supplied to the compression units P1 and P2, in the compression units P1 and P2, may be supplied directly to a compressor that produces one of the two feed gas streams or feed streams in the feed gas conduits (7) and/or (8).

The two latter alternatives are preferably employed when the crude gas stream(s) has/have a lower pressure than the feed streams.

Alternatively, the partial pressure differential may also be generated by a purge gas on the permeate side. This procedure too is known to the person skilled in the art.

Devices for increasing the pressure in the permeate gas discharge conduits (15) and (16) and/or (22) and (23) and/or (26) and (27) are advisable for increasing the driving force, but are not preferred on account of the apparatus complexity.

Further modifications of the 3-stage interconnection are easily discoverable by a person skilled in the art with reference to the teaching according to the invention.

More preferably, the device according to the invention and the method according to the invention are therefore characterized in that

- they comprise three membrane separation stages A, B and C, where all three membrane separation stages A, B and C each comprise a membrane block (1) or multiple membrane blocks (1) each comprising multiple membrane separation units (2) connected in parallel, and
- the gas distributor of the first membrane separation stage A is configured such that it connects the first feed gas conduit (7) and the second feed gas conduit (8) to the gas inlets (3) of the membrane separation units (2) of the first membrane separation stage A in such a way that, in each membrane block (1) of the membrane separation stage A, at least two different membrane separation units (2) are supplied with gas streams of different composition,
- the first membrane separation stage A is configured such that two different retentate streams are obtained in a first retentate gas discharge conduit (12) and a second retentate gas discharge conduit (13), and two different permeate streams are obtained in a first permeate gas discharge conduit (15) and a second permeate gas discharge conduit (16),
- the two retentate streams from the first membrane separation stage A are supplied as feed streams to the second membrane separation stage B, where the retentate gas discharge conduits (12) and (13) are connected to the gas distributor of the second membrane separation stage B,
- the two permeate streams from the first membrane separation stage A are supplied as feed streams to the third membrane separation stage C, where the permeate gas discharge conduits (15) and (16) are connected to the gas distributor of the third membrane separation stage C,
- the gas distributor of the second membrane separation stage B is configured such that it connects the first retentate gas discharge conduit (12) and the second retentate gas discharge conduit (13) to the gas inlets (3) of the membrane separation units (2) of the second membrane separation stage B in such a way that, in each membrane block (1) of the second membrane separation stage B, at least two different membrane separation units (2) are supplied with gas streams of different composition, and

- the gas distributor of the third membrane separation stage C is configured such that it connects the first permeate gas discharge conduit (15) and the second permeate gas discharge conduit (16) to the gas inlets (3) of the membrane separation units (2) of the third membrane separation stage C in such a way that, in each membrane block (1) of the third membrane separation stage C, at least two different membrane separation units (2) are supplied with gas streams of different composition.

More preferably, the second membrane separation stage B is configured such that two different retentate streams are obtained in a first retentate gas discharge conduit (24) and a second retentate gas discharge conduit (25) and/or two different permeate streams are obtained in a first permeate gas discharge conduit (22) and a second permeate gas discharge conduit (23), and/or the third membrane separation stage C is configured such that two different retentate streams are obtained in a first retentate gas discharge conduit (28) and a second retentate gas discharge conduit (29) and/or two different permeate streams are obtained in a first permeate gas discharge conduit (26) and a second permeate gas discharge conduit (27).

As shown above by way of example with reference to 2- and 3-stage interconnections, the membrane separation stages configured in accordance with the invention may be combined to give any kind of multistage interconnection, more preferably 2-, 3-, 4- and 5-stage interconnections, most preferably 2-, 3- and 4-stage interconnections. Corresponding interconnections are known to the person skilled in the art for "conventional" membrane separation stages that are supplied merely with one gas stream for separation. The 3-stage interconnection is most preferred in the context of the present invention.

In devices according to the invention, membrane separation stages according to the invention that separate at least two different feed gas streams may also be combined with "conventional" membrane separation stages that separate just one gas stream into a permeate stream and a retentate stream. For example, conventional membrane separation stages may be used upstream, for generation of one or more feed gas stream(s).

It is alternatively possible to use conventional membrane separation stages downstream of a membrane separation stage according to the invention. For example, one of the permeate and/or retentate streams obtained from a membrane separation stage according to the invention could be supplied to such a conventional membrane separation stage. In addition—as already elucidated above—it is possible to configure the membrane separation stages according to the invention in such a way that only one permeate stream and/or only one retentate stream is obtained in each case. These permeate or retentate streams may then be processed further in conventional membrane separation stages.

As already set out for the specific embodiments according to FIGS. 10 and 11, the membrane separation stages encompassed in the device according to the invention and the method according to the invention require a partial pressure differential between retentate side and permeate side of the membranes. Thus, for all embodiments of the present invention, if the feed gas streams from the respective membrane separation stages should not have an adequate partial pressure differential relative to the permeate side of the membrane separation stages, preference is given to using a compressor in the feed gas conduit and/or a vacuum pump on the permeate side of the membrane. Likewise preferably, as alternative or in combination, it is possible to supply the permeate space with purge gas to increase the partial pressure differential. This is known to the person skilled in the art by the term "sweep". Particular preference is given to using compressors merely in one or more feed streams upstream of the first separation stage according to the invention.

The present invention encompasses—as already indicated above—a method of simultaneous purification of two or more gas streams of different composition. The method according to the invention is conducted in a device according to the invention.

More preferably, the method according to the invention comprises the steps of:

i) providing a first feed gas stream, ii) providing a second feed gas stream of different composition from the first feed gas stream, iii) feeding the first and second feed gas streams to a membrane separation stage, wherein the membrane separation stage has one membrane separation block (1) or multiple membrane blocks (1), and the membrane separation block(s) (1) each comprise(s) multiple membrane separation units (2) connected in parallel, the membrane separation stage has a gas distributor comprising connection conduits (18) that each connect the gas inlets (3) of two adjacent membrane separation units (2) of a membrane block (1) to one another, preferably directly and immediately, and/or distributor conduits (4) containing multiple branches (5) that are each connected by means of separate supply conduits (6) to the gas inlets (3) of the individual membrane separation units (2) of a membrane block (1), wherein one or more branch(es) (5) may additionally also have an attachment means for a feed gas conduit, such that, by means of the branch(es) (5), a feed gas conduit and a supply conduit (6) may simultaneously be connected to the distributor conduit (4), the membrane separation stage, if it comprises multiple membrane blocks (1), comprises conduits, preferably conduits (19*a*, 19*b*, 20*a*, 20*b*) that connect the membrane blocks (1) of the membrane separation stage to one another, and where the first and second feed gas streams are each independently supplied at spatially separate sites to a distributor conduit (4) or a connection conduit (18) or a branch (5) or, if present, conduit(s) that connect the membrane blocks (1) of the membrane separation stage to one another, preferably conduit(s) (19*a*, 19*b*, 20*a*, 20*b*), or a gas inlet (3), where the attachment points of the first and second feed gas streams are arranged such that two or more than two branches (5) and/or two or more than two gas inlets (3) are disposed between the attachment points, iv) supplying the first and second feed gas streams by means of the gas distributor to the gas inlets (3) of the membrane separation units (2) of the membrane separation stage, v) separating the gas mixtures supplied via the gas inlets (3) to the membrane separation units (2) by means of gas separation membranes in the membrane separation units (2), in each case into a retentate gas stream and a permeate gas stream.

More preferably, the method of the present invention additionally comprises the steps of:

vi) combining, preferably all, retentate streams from the membrane separation units (2) of a membrane block (1) to give one or more retentate gas stream(s), and/or vii) combining, preferably all, permeate streams from the membrane separation units (2) of a membrane block (1) to give one or more permeate gas stream(s).

The combining of the permeate streams and/or retentate streams can be effected, as described further up, preferably by means of permeate and/or retentate collection conduits, or via retentate and/or permeate connection conduits between the corresponding gas outlets of the membrane separation units.

Further preferred method steps will be apparent from the above description of the device according to the invention and of the method, and the examples and the claims.

The device according to the invention and the method may especially be used in processes in which simultaneous separation of multiple gas streams having different compositions by means of gas separation membranes is necessary. Especially also in processes in which the gas streams to be separated may be subject to fluctuations in terms of their volume flow rates and compositions. This is especially applicable to methods in which renewable energies are used, since these are frequently available only in significantly fluctuating volumes. Further examples for applications are, for example, natural gas fields with different gas sources that are to be processed in a common gas separation device rather than in one gas separation device per gas source, or helium gas sources in which methane is to be separated from helium in a gas separation device, the methane is then to be utilized thermally, and the offgases from the thermal utilization are likewise to be separated by gas separation. Examples 1 and 2 show that the two gas separations can be conducted very much more effectively in a device according to the invention rather than in two separate gas separation devices.

EXAMPLES

For the establishment of the examples, process simulation calculations were conducted in Aspen Custom Modeller (ACM) by the model of Scholz et al., "Modeling Gas Permeation by Linking Nonideal Effects", Industrial & Engineering Chemistry Research, 2013, 52, 1079-1088. Model depth from Scholz et al. utilized for the simulation is as follows:

- Ideal countercurrent flow of retentate and permeate
- Constant permeances and hence constant separation capacities (temperature independent)
- Taking account of pressure drop
- Taking account of energy balance
- Taking account of the Joule-Thomson effect
- Real gas behaviour according to Soave-Redlich-Kwong
- Neglecting of concentration polarization and further non-ideal effects The module geometry utilized is as follows: The outside diameter of the hollow membrane fibres is 415 μm, and the wall thickness of the hollow membrane fibres is 74 μm. The fibre length is 1 m and the module diameter is 0.16 m. In the examples, a membrane separation unit corresponds to a membrane module in the simulation. The fibre count is 76 700. The heat transfer coefficient of the fibres is 4 W/($m^2$ K). In the examples, a membrane separation unit corresponds to a membrane module in the simulation.

Example Series 1 (Examples 1.1 to 1.9)

In Example Series 1, a separation system corresponding to FIG. 1 is used. The first feed gas stream A consists of 10% by volume of helium (He) and 90% by volume of methane ($CH_4$). The second feed gas stream B consists of 40% by volume of $CO_2$ and 60% by volume of $N_2$. Feed gas stream A and feed gas stream B are supplied to a membrane separation stage consisting of a membrane block (1) having 10 membrane separation units (MTE) (2$_1$-2$_{10}$). The permeates and retentates from the respective MTEs are supplied via permeate gas conduits (10$_1$-10$_{10}$) to a permeate collection pipe (14), and via retentate gas conduits (9$_1$-9$_{10}$) to a retentate collection pipe (11). The individual MTEs are each identical and contain hollow polyimide fibre membranes that are operated in countercurrent. The two feed gas streams A and B are supplied at an identical feed gas temperature of 25° C. by means of the feed gas conduit (7) and (8) to a distributor conduit (4) at the opposite ends thereof, and thence via the feed conduits (6$_1$-6$_{10}$) to the respective MTEs (2$_1$-2$_{10}$). The pressure of the retentate gas streams is kept at an identical pressure of 10.00 bara by means of valves in the retentate gas discharge conduits (12) and (13). For the pressure of the feed gas streams in the feed conduits (7) or (8), slightly different values of 10.08 to 10.1 bara result from pressure drops through variation in the volume flow rates. Compositions, temperatures, volume flow rates (flow rates) and pressures of the two feed gas streams A and B can be found in Tables 1a and 1b. The pressure of the permeate gas streams is set to 1.01 bara by means of valves in the permeate gas discharge conduits (15) and (16). Under the conditions specified, the respective MTEs have a separation capacity of 40 000 GPU*$m^2$ for helium (He), 26 700 GPU*$m^2$ for $CO_2$, 800 GPU*$m^2$ for $N_2$ and 530 GPU*$m^2$ for $CH_4$. Accordingly, the selectivities, i.e. the ratio of the permeances of the membrane utilized in the MTEs, are 75 for He/$CH_4$ and 33 for $CO_2$/$N_2$.

In this example, the sum total of the volume flow rates of the two feed gas streams is always 1000 $m^3$/h (STP). In the example series of Examples 1.1 to 1.9, however, the individual volume flow rates are each varied such that the volume flow rate of feed stream A increases from example to example, and the volume flow rate of feed stream B decreases to the same degree From example to example.

In Example Series 1, the different feed gas streams each flow unmixed into the MTEs, and the retentate gas and permeate gas streams are also drawn off without mixing. This is ensured by means of corresponding pigs in the distributor conduit (4) or the permeate collection pipe (14) and the retentate collection pipe (11). The pressure drop over the distributor conduit (4) and branches (5) in the present example is only a few mbar, which means that the feed gas is divided virtually ideally in terms of amount between the MTEs.

In Example 1.1, on account of the low volume flow rate of the feed gas stream A, it is supplied solely to MTE (2$_1$) via supply conduit (6$_1$), the retentate gas from the MTE (2$_1$) is drawn off from retentate gas conduit (9$_1$) exclusively via retentate gas discharge conduit (12), and the permeate gas from the MTE (2$_1$) is drawn off from permeate gas conduit (10$_1$) exclusively via the permeate gas discharge conduit (15). Correspondingly, the feed gas stream B is supplied to the remaining MTEs (2$_2$ bis 2$_{10}$) via the feed conduits (6$_2$ bis 6$_{10}$), the retentate gas from the retentate gas conduits (9$_2$ bis 9$_{10}$) is removed exclusively via the retentate gas discharge conduit (13), and the permeate gas from the permeate gas conduits (10$_2$ bis 10$_{10}$) is drawn off exclusively via the permeate gas discharge conduit (16). The separation outcome in all four gas discharge conduits (retentate gas discharge conduits 12 and 13, and permeate gas discharge conduits 15 and 16) is in each case the ideally achievable purities and yields in which the product of purity and yield is at a maximum.

Compositions, temperature, volume flow rate (flow rate), pressures and yields of the two permeate streams (15) and (16) and two retentate streams (12) and (13) obtained in the respective Examples 1.1 to 1.9 can be found in Tables 2a and 2d.

TABLE 1a

Feed stream A measured in the supply conduit (7)

| Example # | Pressure [bar(a)] | Temp. [° C.] | Flow rate [$m^3$ (STP)/h] | He [% by vol.] | $CH_4$ [% by vol.] |
|---|---|---|---|---|---|
| 1.1 | 10.08 | 25 | 100 | 10 | 90 |
| 1.2 | 10.08 | 25 | 200 | 10 | 90 |
| 1.3 | 10.09 | 25 | 300 | 10 | 90 |
| 1.4 | 10.09 | 25 | 400 | 10 | 90 |

TABLE 1a-continued

| Feed stream A measured in the supply conduit (7) | | | | | |
|---|---|---|---|---|---|
| Example # | Pressure [bar(a)] | Temp. [° C.] | Flow rate [m³ (STP)/h] | He [% by vol.] | $CH_4$ [% by vol.] |
| 1.5 | 10.09 | 25 | 500 | 10 | 90 |
| 1.6 | 10.09 | 25 | 600 | 10 | 90 |
| 1.7 | 10.1 | 25 | 700 | 10 | 90 |
| 1.8 | 10.1 | 25 | 800 | 10 | 90 |
| 1.9 | 10.1 | 25 | 900 | 10 | 90 |

TABLE 1b

| Feed stream B measured in the supply conduit (8) | | | | | |
|---|---|---|---|---|---|
| Example # | Pressure [bar(a)] | Temp. [° C.] | Flow rate [m³ (STP)/h] | $CO_2$ [% by vol.] | $N_2$ [% by vol.] |
| 1.1 | 10.1 | 25 | 900 | 40 | 60 |
| 1.2 | 10.1 | 25 | 800 | 40 | 60 |
| 1.3 | 10.1 | 25 | 700 | 40 | 60 |
| 1.4 | 10.09 | 25 | 600 | 40 | 60 |
| 1.5 | 10.09 | 25 | 500 | 40 | 60 |
| 1.6 | 10.09 | 25 | 400 | 40 | 60 |
| 1.7 | 10.09 | 25 | 300 | 40 | 60 |
| 1.8 | 10.08 | 25 | 200 | 40 | 60 |
| 1.9 | 10.08 | 25 | 100 | 40 | 60 |

TABLE 2a

| First retentate stream in retentate gas discharge conduit (12) | | | | | | |
|---|---|---|---|---|---|---|
| Example # | Pressure [bar(a)] | Temp. [° C.] | Flow rate [m³ (STP)/h] | He [% by vol.] | $CH_4$ [% by vol.] | $CH_4$ yield [%] |
| 1.1 | 10 | 24.8 | 77.7 | 0.64 | 99.4 | 85.7 |
| 1.2 | 10 | 24.8 | 155 | 0.64 | 99.4 | 85.7 |
| 1.3 | 10 | 24.8 | 233 | 0.64 | 99.4 | 85.7 |
| 1.4 | 10 | 24.8 | 311 | 0.64 | 99.4 | 85.7 |
| 1.5 | 10 | 24.8 | 388 | 0.64 | 99.4 | 85.7 |
| 1.6 | 10 | 24.8 | 466 | 0.64 | 99.4 | 85.7 |
| 1.7 | 10 | 24.8 | 544 | 0.64 | 99.4 | 85.7 |
| 1.8 | 10 | 24.8 | 621 | 0.64 | 99.4 | 85.7 |
| 1.9 | 10 | 24.8 | 699 | 0.64 | 99.4 | 85.7 |

TABLE 2b

| Second retentate stream in retentate gas discharge conduit (13) | | | | | | |
|---|---|---|---|---|---|---|
| Example # | Pressure [bar(a)] | Temp. [° C.] | Flow rate [m³ (STP)/h] | $CO_2$ [% by vol.] | $N_2$ [% by vol.] | $N_2$ yield [%] |
| 1.1 | 10 | 21.8 | 389 | 0.40 | 99.6 | 71.8 |
| 1.2 | 10 | 21.8 | 346 | 0.40 | 99.6 | 71.8 |
| 1.3 | 10 | 21.8 | 303 | 0.40 | 99.6 | 71.8 |
| 1.4 | 10 | 21.8 | 259 | 0.40 | 99.6 | 71.8 |
| 1.5 | 10 | 21.8 | 216 | 0.40 | 99.6 | 71.8 |
| 1.6 | 10 | 21.8 | 173 | 0.40 | 99.6 | 71.8 |
| 1.7 | 10 | 21.8 | 130 | 0.40 | 99.6 | 71.8 |
| 1.8 | 10 | 21.8 | 86.5 | 0.40 | 99.6 | 71.8 |
| 1.9 | 10 | 21.8 | 43.2 | 0.40 | 99.6 | 71.8 |

TABLE 2c

| First permeate stream in permeate gas discharge conduit (15) | | | | | | |
|---|---|---|---|---|---|---|
| Example # | Pressure [bar(a)] | Temp. [° C.] | Flow rate [m³ (STP)/h] | He [% by vol.] | $CH_4$ [% by vol.] | He yield [%] |
| 1.1 | 1.01 | 25.6 | 22.4 | 42.5 | 57.5 | 95.0 |
| 1.2 | 1.01 | 25.6 | 44.7 | 42.5 | 57.5 | 95.0 |
| 1.3 | 1.01 | 25.6 | 67.1 | 42.5 | 57.5 | 95.0 |
| 1.4 | 1.01 | 25.6 | 89.4 | 42.5 | 57.5 | 95.0 |
| 1.5 | 1.01 | 25.6 | 112 | 42.5 | 57.5 | 95.0 |
| 1.6 | 1.01 | 25.6 | 134 | 42.5 | 57.5 | 95.0 |
| 1.7 | 1.01 | 25.6 | 156 | 42.5 | 57.5 | 95.0 |
| 1.8 | 1.01 | 25.6 | 179 | 42.5 | 57.5 | 95.0 |
| 1.9 | 1.01 | 25.6 | 201 | 42.5 | 57.5 | 95.0 |

TABLE 2d

| Second permeate stream in permeate gas discharge conduit (16) | | | | | | |
|---|---|---|---|---|---|---|
| Example # | Pressure [bar(a)] | Temp. [° C.] | Flow rate [m³ (STP)/h] | $CO_2$ [% by vol.] | $N_2$ [% by vol.] | $CO_2$ yield [%] |
| 1.1 | 1.01 | 21.3 | 511 | 70.2 | 29.8 | 99.6 |
| 1.2 | 1.01 | 21.3 | 454 | 70.2 | 29.8 | 99.6 |
| 1.3 | 1.01 | 21.3 | 397 | 70.2 | 29.8 | 99.6 |
| 1.4 | 1.01 | 21.3 | 341 | 70.2 | 29.8 | 99.6 |
| 1.5 | 1.01 | 21.3 | 284 | 70.2 | 29.8 | 99.6 |
| 1.6 | 1.01 | 21.3 | 227 | 70.2 | 29.8 | 99.6 |
| 1.7 | 1.01 | 21.3 | 170 | 70.2 | 29.8 | 99.6 |
| 1.8 | 1.01 | 21.3 | 114 | 70.2 | 29.8 | 99.6 |
| 1.9 | 1.01 | 21.3 | 56.8 | 70.2 | 29.8 | 99.6 |

Example Series 2 (Examples 2.1 to 2.8)

Example Series 2 corresponds to Example Series 1, except that the feed gas streams arrive at the MTEs in less ideally separated form and are removed as retentate gas and permeate gas in a less ideal manner. In other words, the pig used in the connection conduit (4) in Example 1 is dispensed with, and the two gas streams can mix to a small degree at the site where they meet. In Example Series 2, the meeting of feed gas stream A and feed gas stream B takes place in such a way that 50 m³ (STP)/h feed gas stream A and 50 m³ (STP)/h of feed gas stream B in each case are supplied via the closest feed conduit in each case to the corresponding MTE. This means, for Example 2.1, that MTE ($\mathbf{2}_1$) is supplied with pure feed stream A, MTE ($\mathbf{2}_2$) with a mixture of 50% by volume of feed stream A and 50% by volume of feed stream B, and MTEs ($\mathbf{2}_3$ to $\mathbf{2}_{10}$) with pure feed stream B.

The retentate gas from the retentate gas conduit of the MTE that separates the mixed gas, which is MTE ($\mathbf{2}_2$) in Example 2.1, flows in equal proportions in the direction of retentate gas discharge conduit (12) or (13). The permeate gas from the MTE that separates the mixed gas also flows in equal proportions in the direction of the permeate gas discharge conduit (15) or (16). The retentate gases from the MTEs that separate feed gas stream A only, which is MTE ($\mathbf{2}_1$) in Example 2.1, flow completely to retentate gas discharge conduit (12), and the retentate gases from the MTEs that separate feed gas stream B only, which is MTE ($\mathbf{2}_1$) in Example 2.1, flow completely to retentate gas discharge conduit (13). The situation is analogous with the permeate streams from the respective MTEs. The above-described division of the flows between the retentate gas discharge conduit (12) or (13) or the permeate gas discharge conduit (15) or (16) is controlled by appropriate valves in the retentate gas discharge conduit (12) or (13) or the permeate gas discharge conduit (15) or (16).

Compositions, temperatures, volume flow rates (flow rates) and pressures of the two feed gas streams A and B can be found in Tables 3a and 3b. Tables 4a to 4d summarize the results of Examples 2.1 to 2.8. It is clearly apparent that such a form of operation is at the expense of the separation outcome for the quantitatively smaller feed gas stream supplied. For instance, according to Example 2.1, in the case of a very small feed gas stream A compared to feed gas stream B, any separation aim such as the enrichment of methane is not attained. The methane purity in the retentate gas discharge conduit (12) reaches only 88.6% by volume, rather than the 99.4% achieved in the ideal case from Table 2a. Nevertheless, Example 2.1 achieves a distinct enrichment of helium in the permeate gas discharge conduit (15) from 10% in feed gas stream A to 28.7%. In the ideal case from Example Series 1, however, 42.1% would be achievable.

In the case of the more balanced volume flow rates between feed gas streams A and B in Examples 2.3 to 2.7, in spite of operation with lower mixing of the feed gas streams, good separation outcomes are found in all gas discharge conduits (12, 13, 15, 16).

TABLE 3a

| Feed stream A measured in the supply conduit (7) | | | | | |
|---|---|---|---|---|---|
| Example # | Pressure [bar(a)] | Temp. [° C.] | Flow rate [$m^3$ (STP)/h] | He [% by vol.1 | $CH_4$ [% by vol.] |
| 2.1 | 10.08 | 25 | 150 | 10 | 90 |
| 2.2 | 10.08 | 25 | 250 | 10 | 90 |
| 2.3 | 10.09 | 25 | 350 | 10 | 90 |
| 2.4 | 10.09 | 25 | 450 | 10 | 90 |
| 2.5 | 10.09 | 25 | 550 | 10 | 90 |
| 2.6 | 10.09 | 25 | 650 | 10 | 90 |
| 2.7 | 10.1 | 25 | 750 | 10 | 90 |
| 2.8 | 10.1 | 25 | 850 | 10 | 90 |

TABLE 3b

| Feed stream B measured in the supply conduit (8) | | | | | |
|---|---|---|---|---|---|
| Example # | Pressure [bar(a)] | Temp. [° C.] | Flow rate [$m^3$ (STP)/h] | $CO_2$ [% by vol.] | $N_2$ [% by vol.] |
| 2.1 | 10.1 | 25 | 850 | 40 | 60 |
| 2.2 | 10.1 | 25 | 750 | 40 | 60 |
| 2.3 | 10.1 | 25 | 650 | 40 | 60 |
| 2.4 | 10.09 | 25 | 550 | 40 | 60 |
| 2.5 | 10.09 | 25 | 450 | 40 | 60 |
| 2.6 | 10.09 | 25 | 350 | 40 | 60 |
| 2.7 | 10.09 | 25 | 250 | 40 | 60 |
| 2.8 | 10.08 | 25 | 150 | 40 | 60 |

TABLE 4a

| First retentate stream in retentate gas discharge conduit (12) | | | | | | | | |
|---|---|---|---|---|---|---|---|---|
| Example # | Pressure [bar(a)] | Temp. [° C.] | Flow rate [$m^3$ (STP)/h] | He [% by vol.] | $CH_4$ [% by vol.] | $CO_2$ [% by vol.] | $N_2$ [% by vol.] | $CH_4$ yield [%] |
| 2.1 | 10 | 24.0 | 108 | 0.48 | 88.6 | 0.24 | 10.66 | 71.1 |
| 2.2 | 10 | 24.3 | 186 | 0.55 | 93.1 | 0.14 | 6.21 | 76.9 |
| 2.3 | 10 | 24.5 | 264 | 0.57 | 94.9 | 0.10 | 4.38 | 79.4 |
| 2.4 | 10 | 24.5 | 341 | 0.59 | 96.0 | 0.08 | 3.38 | 80.8 |
| 2.5 | 10 | 24.6 | 419 | 0.60 | 96.6 | 0.06 | 2.76 | 81.7 |
| 2.6 | 10 | 24.6 | 497 | 0.60 | 97.0 | 0.05 | 2.33 | 82.3 |
| 2.7 | 10 | 24.6 | 574 | 0.61 | 97.3 | 0.05 | 2.01 | 82.8 |
| 2.8 | 10 | 24.7 | 652 | 0.61 | 97.6 | 0.04 | 1.77 | 83.1 |

TABLE 4b

| Second retentate stream in retentate gas discharge conduit (13) | | | | | | | | |
|---|---|---|---|---|---|---|---|---|
| Example # | Pressure [bar(a)] | Temp. [° C.] | Flow rate [$m^3$ (STP)/h] | He [% by vol.] | $CH_4$ [% by vol.] | $CO_2$ [% by vol.] | $N_2$ [% by vol.] | $N_2$ yield [%] |
| 2.1 | 10 | 22.0 | 377 | 0.01 | 4.99 | 0.44 | 94.6 | 69.8 |
| 2.2 | 10 | 22.1 | 333 | 0.01 | 5.64 | 0.44 | 93.9 | 69.6 |
| 2.3 | 10 | 22.1 | 290 | 0.01 | 6.48 | 0.45 | 93.1 | 69.2 |
| 2.4 | 10 | 22.2 | 247 | 0.01 | 7.61 | 0.46 | 91.9 | 68.8 |
| 2.5 | 10 | 22.3 | 204 | 0.01 | 9.23 | 0.47 | 90.3 | 68.1 |
| 2.6 | 10 | 22.4 | 160 | 0.01 | 11.72 | 0.49 | 87.8 | 67.0 |
| 2.7 | 10 | 22.6 | 117 | 0.02 | 16.04 | 0.52 | 83.4 | 65.1 |
| 2.8 | 10 | 23.0 | 74 | 0.03 | 25.44 | 0.59 | 73.9 | 60.7 |

TABLE 4c

| First permeate stream in permeate gas discharge conduit (15) | | | | | | | | |
|---|---|---|---|---|---|---|---|---|
| Example # | Pressure [bar(a)] | Temp. [° C.] | Flow rate [$m^3$ (STP)/h] | He [% by vol.] | $CH_4$ [% by vol.] | $CO_2$ [% by vol.] | $N_2$ [% by vol.] | He yield [%] |
| 2.1 | 1.01 | 23.6 | 42 | 28.7 | 39.7 | 23.3 | 8.28 | 79.9 |
| 2.2 | 1.01 | 24.3 | 64 | 33.5 | 45.9 | 15.2 | 5.39 | 85.9 |
| 2.3 | 1.01 | 24.6 | 86 | 35.9 | 48.9 | 11.3 | 4.00 | 88.5 |
| 2.4 | 1.01 | 24.8 | 109 | 37.2 | 50.6 | 8.95 | 3.18 | 90.0 |
| 2.5 | 1.01 | 25.0 | 131 | 38.1 | 51.8 | 7.43 | 2.63 | 90.9 |
| 2.6 | 1.01 | 25.1 | 153 | 38.8 | 52.6 | 6.35 | 2.25 | 91.5 |
| 2.7 | 1.01 | 25.1 | 176 | 39.2 | 53.3 | 5.54 | 1.96 | 92.0 |
| 2.8 | 1.01 | 25.2 | 198 | 39.6 | 53.7 | 4.92 | 1.74 | 92.4 |

TABLE 4d

| Second permeate stream in permeate gas discharge conduit (16) | | | | | | | | |
|---|---|---|---|---|---|---|---|---|
| Example # | Pressure [bar(a)] | Temp. [° C.] | Flow rate [$m^3$ (STP)/h] | He [% by vol.] | $CH_4$ [% by vol.] | $CO_2$ [% by vol.] | $N_2$ [% by vol.] | $CO_2$ yield [%] |
| 2.1 | 1.01 | 21.5 | 473 | 0.52 | 0.78 | 69.4 | 29.3 | 96.6 |
| 2.2 | 1.01 | 21.5 | 417 | 0.59 | 0.89 | 69.2 | 29.3 | 96.2 |
| 2.3 | 1.01 | 21.5 | 360 | 0.69 | 1.03 | 69.1 | 29.2 | 95.6 |
| 2.4 | 1.01 | 21.6 | 303 | 0.82 | 1.22 | 68.9 | 29.1 | 94.9 |
| 2.5 | 1.01 | 21.6 | 246 | 1.01 | 1.51 | 68.6 | 28.9 | 93.9 |
| 2.6 | 1.01 | 21.7 | 190 | 1.31 | 1.96 | 68.1 | 28.6 | 92.3 |
| 2.7 | 1.01 | 21.9 | 133 | 1.86 | 2.79 | 67.3 | 28.1 | 89.4 |
| 2.8 | 1.01 | 22.4 | 76 | 3.25 | 4.88 | 65.1 | 26.8 | 82.6 |

Comparative Example 1

As a noninventive example, a system in which the two feed gas streams A and B of Examples 1 and 2 are each separately supplied to a separate membrane separation stage 1 or 2 is considered.

Since the volume flow rates of the respective feed gas streams can fluctuate as in Example Series 1 and 2, the number of MTEs connected in parallel in each of membrane separation stages 1 and 2 must be designed for the maximum volume flow rate. This means that, compared to the 10 MTEs in Inventive Examples 1 and 2, there are now two lots of 10 MTEs required, i.e. twice as many MTEs. Since, however, there is variation in the volume flow rates of the two feed gas streams, not all MTEs in the respective membrane separation stage 1 or 2 are under full load at every juncture of operation. The result of the separation under these conditions, i.e. operation of the MTEs under partial load, is shown in Tables 6a to d. Compositions, temperatures, volume flow rates (flow rates) and pressures of the two feed gas streams A and B can be found in Tables 5a and 5b.

TABLE 5a

| | Feed to membrane separation stage 1 | | | | |
|---|---|---|---|---|---|
| Comparative example # | Pressure [bar(a)] | Temp. [° C.] | Flow rate [$m^3$ (STP)/h] | He [% by vol.] | $CH_4$ [% by vol.1 |
| 1.1 | 10.08 | 25 | 1000 | 10 | 90 |
| 1.2 | 10.08 | 25 | 950 | 10 | 90 |
| 1.3 | 10.09 | 25 | 850 | 10 | 90 |
| 1.4 | 10.09 | 25 | 750 | 10 | 90 |
| 1.5 | 10.09 | 25 | 650 | 10 | 90 |
| 1.6 | 10.09 | 25 | 550 | 10 | 90 |

TABLE 5a-continued

| | Feed to membrane separation stage 1 | | | | |
|---|---|---|---|---|---|
| Comparative example # | Pressure [bar(a)] | Temp. [° C.] | Flow rate [$m^3$ (STP)/h] | He [% by vol.] | $CH_4$ [% by vol.1 |
| 1.7 | 10.1 | 25 | 450 | 10 | 90 |
| 1.8 | 10.1 | 25 | 350 | 10 | 90 |
| 1.9 | 10.1 | 25 | 250 | 10 | 90 |

TABLE 5b

| | Feed to membrane separation stage 2 | | | | |
|---|---|---|---|---|---|
| Comparative example # | Pressure [bar(a)] | Temp. [° C.] | Flow rate [$m^3$ (STP)/h] | $CO_2$ [% by vol.] | $N_2$ [% by vol.] |
| 1.1 | 10.1 | 25 | 1000 | 40 | 60 |
| 1.2 | 10.1 | 25 | 950 | 40 | 60 |
| 1.3 | 10.1 | 25 | 850 | 40 | 60 |
| 1.4 | 10.09 | 25 | 750 | 40 | 60 |
| 1.5 | 10.09 | 25 | 650 | 40 | 60 |
| 1.6 | 10.09 | 25 | 550 | 40 | 60 |
| 1.7 | 10.09 | 25 | 450 | 40 | 60 |
| 1.8 | 10.08 | 25 | 350 | 40 | 60 |
| 1.9 | 10.08 | 25 | 250 | 40 | 60 |

TABLE 6a

| Comparative example # | Retentate from membrane separation stage 1 Pressure [bar(a)] | Temp. [° C.] | Flow rate [m³ (STP)/h] | He [% by vol.] | $CH_4$ [% by vol.] | $CH_4$ yield [%] |
|---|---|---|---|---|---|---|
| 1.1 | 10 | 24.8 | 777 | 0.64 | 99.4 | 85.7 |
| 1.2 | 10 | 24.8 | 730 | 0.53 | 99.5 | 85.0 |
| 1.3 | 10 | 24.7 | 639 | 0.32 | 99.7 | 83.2 |
| 1.4 | 10 | 24.5 | 548 | 0.16 | 99.8 | 81.0 |
| 1.5 | 10 | 24.4 | 457 | 0.06 | 99.9 | 78.1 |
| 1.6 | 10 | 24.1 | 367 | 0.01 | 100.0 | 74.2 |
| 1.7 | 10 | 23.7 | 278 | 0.00 | 100.0 | 68.6 |
| 1.8 | 10 | 22.9 | 189 | 0.00 | 100.0 | 60.1 |
| 1.9 | 10 | 21.1 | 102 | 0.00 | 100.0 | 45.4 |

TABLE 6b

| Comparative example # | Retentate from membrane separation stage 2 Pressure [bar(a)] | Temp. [° C.] | Flow rate [m³ (STP)/h] | $CO_2$ [% by vol.] | $N_2$ [% by vol.] | $N_2$ yield [%] |
|---|---|---|---|---|---|---|
| 1.1 | 10 | 21.8 | 432 | 0.40 | 99.6 | 71.8 |
| 1.2 | 10 | 21.5 | 402 | 0.28 | 99.7 | 70.3 |
| 1.3 | 10 | 21.4 | 340 | 0.11 | 99.9 | 66.7 |
| 1.4 | 10 | 21.3 | 279 | 0.03 | 100.0 | 62.1 |
| 1.5 | 10 | 21.1 | 219 | 0.00 | 100.0 | 56.1 |
| 1.6 | 10 | 20.6 | 158 | 0.00 | 100.0 | 48.0 |
| 1.7 | 10 | 19.8 | 99 | 0.00 | 100.0 | 36.7 |
| 1.8 | 10 | 17 | 44 | 0.00 | 100.0 | 20.7 |
| 1.9 | 10 | 2.7 | 7 | 0.00 | 100.0 | 4.7 |

TABLE 6c

| Comparative example # | Permeate from membrane separation stage 1 Pressure [bar(a)] | Temp. [° C.] | Flow rate [m³ (STP)/h] | He [% by vol.] | $CH_4$ [% by vol.] | He yield [%] |
|---|---|---|---|---|---|---|
| 1.1 | 1.01 | 26 | 223 | 42.5 | 57.5 | 95.0 |
| 1.2 | 1.01 | 26 | 220 | 41.5 | 58.5 | 96.0 |
| 1.3 | 1.01 | 26 | 211 | 39.2 | 60.8 | 97.6 |
| 1.4 | 1.01 | 26 | 202 | 36.6 | 63.4 | 98.8 |
| 1.5 | 1.01 | 26 | 193 | 33.6 | 66.4 | 99.6 |
| 1.6 | 1.01 | 26 | 183 | 30.1 | 69.9 | 99.9 |
| 1.7 | 1.01 | 26 | 172 | 26.2 | 73.8 | 100.0 |
| 1.8 | 1.01 | 25 | 161 | 21.8 | 78.2 | 100.0 |
| 1.9 | 1.01 | 25 | 148 | 16.9 | 83.1 | 100.0 |

TABLE 6d

| Comparative example # | Permeate from membrane separation stage 2 Pressure [bar(a)] | Temp. [° C.] | Flow rate [m³ (STP)/h] | $CO_2$ [% by vol.] | $N_2$ [% by vol.] | $CO_2$ yield [%] |
|---|---|---|---|---|---|---|
| 1.1 | 1.01 | 21 | 568 | 70.2 | 29.8 | 99.6 |
| 1.2 | 1.01 | 22 | 548 | 69.1 | 30.9 | 99.7 |
| 1.3 | 1.01 | 22 | 509 | 66.7 | 33.3 | 99.9 |
| 1.4 | 1.01 | 22 | 471 | 63.7 | 36.3 | 100.0 |
| 1.5 | 1.01 | 22 | 431 | 60.3 | 39.7 | 100.0 |
| 1.6 | 1.01 | 22 | 392 | 56.2 | 43.8 | 100.0 |
| 1.7 | 1.01 | 22 | 351 | 51.3 | 48.7 | 100.0 |
| 1.8 | 1.01 | 22 | 307 | 45.7 | 54.3 | 100.0 |
| 1.9 | 1.01 | 21 | 243 | 41.2 | 58.8 | 100.0 |

The results from Tables 6a to 6d show that, in the case of operation of the MTEs in the part-load range—caused by the variations in the feed streams—in spite of twice the number of MTEs used compared to Inventive Examples 1 and 2, it is not possible to achieve a satisfactory separation outcome in each case.

It would then be possible in the apparatus used in the comparative example, for example through installation of additional valves to shut off individual MTEs, to ensure that the MTEs that have not been shut off are always operated in the full-load range. However, this would even more distinctly increase the apparatus complexity caused by the doubling of the number of MTEs, and result in additional control-related complexity.

Comparison of the Separation Efficiencies of Examples 1 and 2 with Comparative Example 1

In FIG. 12, the results of Examples 1 and 2 and of the comparative example are plotted for comparison. What is plotted is the product of yield and purity of methane in the retentate (retentate gas conduit (12)) based on the maximum achievable value against the amount of feed gas in m³ (STP)/h. Inventive Example 1 always gives the maximum achievable product of $CH_4$ purity and $CH_4$ yield, and hence a relative value of 100%. In Comparative Example 1, the maximum value is attained only at a full load of 1000 m³ (STP)/h and then drops off rapidly. Inventive Example 2 maintains relatively high values over a broad part-load range.

An increase in the number of MTEs in Example Series 2, for example via utilization of MTEs having lower separation capacity for the same total installed separation capacity, can distinctly reduce the described adverse effect of partial mixing of the feed gas streams resulting from the dilution effect in the apparatus according to the invention. In the assessment of limiting values, given an infinitely high number of MTEs, the ideal result of Example 1 is found.

The use of several hundred membrane separation units is entirely realistic in the field of gas separation.

Example 3

In Example 3, the inventive operation of a membrane separation stage with a membrane block (19) having 10 membrane separation units (2) connected in parallel according to FIG. 1 in the field of helium source gas is considered. The individual membrane separation units (2) have the properties described in Example 1. The feed gas streams supplied separately in the feed gas conduits (7) and (8) are also divided ideally as in Example 1. By contrast with Example 1, only a retentate gas stream (12) and a permeate gas stream (15) are generated by supplying the retentate or permeate streams from the membrane separation units (2) by means of retentate and permeate gas conduits (9) and (10) to a retentate gas collection pipe (11) or permeate gas collection pipe (14), each of which is connected solely to a retentate gas discharge conduit (12) or permeate gas discharge conduit (15). Sampling sites were mounted in the retentate gas conduits (9) to ascertain the retentate concentration of the individual membrane separation units (2).

Helium source gas is helium-containing natural gas sources. According to the region and to some degree also according to the source within a smaller region, there are distinctly different helium concentrations in some cases. In Example 3, it is assumed by way of simplification that the two sources in question contain exclusively helium and methane. Source 1 (feed gas stream 1) contains 1% helium, and source 2 (feed gas stream 2) contains 3% helium. The aim of the separation is to obtain a helium content of only 0.2% in the retentate for both feed gas streams, in order still to achieve relatively good yields of helium in the permeate. For the supply of the feed gas streams shown in Table 7, a helium concentration of 0.2% is found in each retentate gas conduit. Table 7 shows the flow rates and concentrations of the retentate and permeate gas streams.

TABLE 7

| | Flow rate [m$^3$ (STP)/h] | Pressure [bara] | Temperature [° C.] | He [% by vol.] | CH4 [% by vol.] |
|---|---|---|---|---|---|
| Feed gas stream 1 | 572 | 10.11 | 25.0 | 1.0 | 99.0 |
| Feed gas stream 2 | 435 | 10.08 | 25.0 | 3.0 | 97.0 |
| Retentate gas stream | 861 | 10 | 24.6 | 0.20 | 99.80 |
| Permeate gas stream | 146 | 1.01 | 24.9 | 11.69 | 88.31 |
| Yield | | | | 90.8% | 87% |

Comparative Example 2

In the noninventive Comparative Example 2 relative to Example 3, the feed gas stream 1 of source 1 and feed gas stream 2 of source 2 are mixed and then supplied as one feed gas stream via a feed gas conduit to the 10 membrane separation units, such that each membrane separation unit separates the same feed gas stream. The rest of the construction of the membrane separation stage corresponds to Example 3. The result is summarized in Table 8.

TABLE 8

| | Flow rate [m$^3$ (STP)/h] | Pressure [bara] | Temperature [° C.] | He [% by vol.] | CH4 [% by vol.] |
|---|---|---|---|---|---|
| Feed gas stream | 1007 | 10.1 | 25.0 | 1.9 | 98.1 |
| Retentate gas stream | 861 | 10 | 24.5 | 0.24 | 99.76 |
| Permeate gas stream | 146 | 1.01 | 24.9 | 11.49 | 88.51 |
| Yield | | | | 89.0% | 87.0% |

If Example 3 and Comparative Example 2 are then compared, it is found that the separate supply of the feed gas streams according to Example 3 leads to a better separation outcome overall. First of all, the purities of helium in the permeate and methane in the retentate that are achieved in Example 3 are higher than in Comparative Example 2. Moreover, the yield of helium in the permeate, i.e. the amount of helium in the permeate gas stream based on the amount of helium in the feed gas stream, in Example 3 is higher than in Comparative Example 2. In other words, more valuable helium is obtained at a higher helium purity. If the situation is compared for methane in the retentate gas stream, it is found that even the product of methane purity and methane yield in Example 3 is slightly higher than in Comparative Example 2.

LIST OF REFERENCE NUMERALS (1) Membrane block according to the invention
(2) Membrane separation unit; the respective membrane separation units connected in parallel in a membrane block are indexed from ($\mathbf{2}_1$) to ($\mathbf{2}_n$), where the index n corresponds to the serial number and the number n corresponds to the number of membrane separation units connected in parallel
(3) Gas inlet of a membrane separation unit; the respective gas inlets of the membrane separation units connected in parallel in a membrane block are indexed from ($\mathbf{3}_1$) to ($\mathbf{3}_n$), where the index n corresponds to the serial number and the number n corresponds to the number of membrane separation units connected in parallel
(4) Distributor conduit; if there are multiple membrane blocks and hence multiple distributor conduits in one membrane separation stage, these are indexed from ($\mathbf{4}_1$) to ($\mathbf{4}_0$), where o corresponds to the serial number and the number o to the number of distributor conduits present in a membrane separation stage
(5) Branch
(6) Supply conduit to a gas inlet of a membrane separation unit; the respective supply conduits of the membrane separation units connected in parallel in a membrane block are indexed from ($\mathbf{6}_1$) to ($\mathbf{6}_n$), where the index n corresponds to the serial number and the number n corresponds to the number of membrane separation units connected in parallel
(7) First feed gas conduit
(8) Second feed gas conduit
(9) Retentate gas conduit of a membrane separation unit; the respective retentate gas conduits of the membrane separation units connected in parallel in a membrane block are indexed from ($\mathbf{9}_1$) to ($\mathbf{9}_n$), where the index n corresponds to the serial number and the number n corresponds to the number of membrane separation units connected in parallel
(10) Permeate gas conduit of a membrane separation unit; the respective permeate gas conduits of the membrane separation units connected in parallel in a membrane block are indexed from ($\mathbf{10}_1$) to ($\mathbf{10}_n$), where the index n corresponds to the serial number and the number n corresponds to the number of membrane separation units connected in parallel
(11) Retentate gas collection pipe
(12) First retentate gas discharge conduit
(13) Second retentate gas discharge conduit
(14) Permeate gas collection pipe
(15) First permeate gas discharge conduit
(16) Second permeate gas discharge conduit
(17)
(18) Connection conduits
(19*a*) Gas conduit
(19*b*) Gas conduit
(20*a*) Gas conduit
(20*b*) Gas conduit
(21) Third feed gas conduit
(22) First permeate gas conduit of the second membrane separation stage B)
(23) Second permeate gas conduit of the second membrane separation stage B)
(24) First retentate gas conduit of the second membrane separation stage B)
(25) Second retentate gas conduit of the second membrane separation stage B)
(26) First permeate gas conduit of the third membrane separation stage C)
(27) Second permeate gas conduit of the third membrane separation stage C)
(28) First retentate gas conduit of the third membrane separation stage C)
(29) Second retentate gas conduit of the third membrane separation stage C)

(30) Retentate gas outlet of a membrane separation unit; the respective retentate gas outlets of the membrane separation units connected in parallel in a membrane block are indexed from ($3_1$) to ($3_n$), where the index n corresponds to the serial number and the number n corresponds to the number of membrane separation units connected in parallel (31) Permeate gas outlet of a membrane separation unit; the respective permeate gas outlets of the membrane separation units connected in parallel in a membrane block are indexed from ($3_1$) to ($3_n$), where the index n corresponds to the serial number and the number n corresponds to the number of membrane separation units connected in parallel (32) Retentate connection conduit between two retentate gas outlets of two membrane separation units of a membrane block arranged alongside one another (33) Permeate connection conduit between two permeate gas outlets of two membrane separation units of a membrane block arranged alongside one another

The invention claimed is:

1. A device for separating gas mixtures, comprising:

a) a first feed gas conduit (7) which is adapted or configured for transporting a first feed gas stream, and a second feed gas conduit (8) which is adapted or configured for transporting a second feed gas stream of different composition from the first feed gas stream;

b) a membrane separation stage, comprising one membrane block (1) or multiple membrane blocks (1), wherein the membrane block(s) (1) each comprise(s) multiple membrane separation units (2) connected in parallel, and wherein:

each membrane separation unit (2) has a gas inlet (3) and gas separation membranes, and the gas mixture supplied via the gas inlet (3) is separated by means of the gas separation membranes into a retentate gas stream and a permeate gas stream;

each membrane separation unit (2) has a retentate gas outlet (30) for the retentate gas stream which is connected to a retentate gas conduit (9) or connected by means of one or more retentate connection conduit(s) (32) to one or two retentate gas outlet(s) (30) of the adjacent membrane separation unit(s) (2) of the same membrane block (1), and a permeate gas outlet (31) for the permeate gas stream which is connected to a permeate gas conduit (10) or connected by means of one or more permeate connection conduit(s) (33) to one or two permeate gas outlet(s) (31) of the adjacent membrane separation unit(s) (2) of the same membrane block (1);

c) a gas distributor configured such that:

the gas distributor comprises connection conduits (18) that each connect the gas inlets (3) of two adjacent membrane separation units (2) of a membrane block (1) to one another and/or comprises one or more distributor conduit(s) (4) each containing multiple branches (5) that are each connected by means of supply conduits (6) to the gas inlets (3) of the individual membrane separation units (2) of a membrane block (1), wherein one or more branch(es) (5) may additionally also have an attachment means for a feed gas conduit, such that, by means of the branch(es) (5), in each case, a feed gas conduit and a supply conduit (6) may be simultaneously connected to the respective distributor conduit (4);

if the membrane separation stage comprises multiple membrane blocks (1), the gas distributor comprises conduits (19*a*, 19*b*, 20*a*, 20*b*), that connect the membrane blocks (1) of the membrane separation stage to one another;

the first feed gas conduit (7) and the second feed gas conduit (8) are each independently connected at spatially separate sites to a distributor conduit (4) or a connection conduit (18) or a branch (5) or, if present, to a conduit that connects the membrane blocks (1) of the membrane separation stage to one another, or to a gas inlet (3), wherein attachment points are arranged such that two, or more than two, branches (5) and/or two, or more than two, gas inlets (3) are disposed between the attachment points of the first feed gas conduit (7) and the second feed gas conduit (8); and the gas distributor is configured such that, upon simultaneous supply of the first feed gas stream and the second feed gas stream to the gas distributor, the first feed gas stream is supplied to at least one membrane separation unit (2) of a membrane block (1), and the second feed gas stream is supplied to at least one different membrane separation unit (2) of the membrane block (1).

2. The device of claim 1, wherein the attachment points of the first feed gas conduit (7) and the second feed gas conduit (8) are arranged such that the first feed gas stream and the second feed gas stream flow towards each other within one membrane block (1) or multiple membrane blocks (1) of the membrane separation stage, in one or more distributor conduits(s) (4) and/or in one or more connection conduit(s) (18), or within the conduit(s) that connect the membrane blocks (1) of the membrane separation stage to one another (19*a*, 19*b*, 20*a*, 20*b*).

3. The device of claim 1, wherein:

the membrane separation stage contains one membrane block (1) or multiple membrane blocks (1), each having a distributor conduit (4) with multiple branches (5) and supply conduits (6), where in each case a supply conduit (6) connects a branch (5) to a gas inlet (3) of a membrane separation unit (2), and the first feed gas conduit (7) and second feed gas conduit (8) are connected separately and independently to opposite ends of the distributor conduit(s) (4).

4. The device of claim 1, wherein:

a) the membrane separation stage contains one membrane block (1) or multiple membrane blocks (1), each comprising multiple connection conduits (18) that each connect a gas inlet (3) of a membrane separation unit (2) to the gas inlet(s) (3) of the adjacent membrane separation unit(s) (2) in the membrane block (1); and b) the first feed gas conduit (7) and the second feed gas conduit (8) are each separately and independently connected to one gas inlet (3) of a membrane separation unit (2) or multiple gas inlets (3) of membrane separation units (2) and/or to one connection conduit (18) or multiple connection conduits (18).

5. The device of claim 1, wherein the device additionally comprises one, two or three feed gas conduit(s) which are adapted for transporting one, two or three additional gas streams of different composition from the first and second feed gas streams, and the additional feed gas conduit(s) are connected to the gas distributor such that the gas stream can be supplied to the membrane separation units by means of the gas distributor.

6. The device of claim 5, wherein: the feed gas conduit(s) are each independently:

attached to one or more distributor conduit(s) (4), between the attachments of the first feed gas conduit (7) and the second feed gas conduit (8); and/or attached to one or more connection conduit(s) (18), between the attachments of the first feed gas conduit (7) and the second feed gas conduit (8); and/or attached to one gas inlet (3) or multiple gas inlets (3), where the gas inlet (3) or the gas inlets (3) are different from the gas inlets (3) to which the first feed gas conduit (7) and the second feed gas conduit (8) are attached; and/or attached to one gas inlet (3) or multiple gas inlets (3) and one connection conduit (18) or multiple connection conduits (18), where these gas inlets (3) are different from the gas inlets (3) to which the first feed gas conduit (7) and the second feed gas conduit (8) are attached.

7. The device of claim 5, wherein the membrane separation stage comprises multiple membrane blocks (1) that are combined to form a ring circuit, wherein each membrane block (1) is connected to two feed gas conduits.

8. The device of claim 1, wherein the membrane separation stage comprises multiple membrane blocks (1) connected in parallel.

9. The device of claim 8, wherein:

the gas distributor comprises one distributor conduit (4) with multiple branches (5) and supply conduits (6) per membrane block (1), where in each case a supply conduit (6) connects a branch (5) to a gas inlet (3) of a membrane separation unit (2);

the distributor conduits (4) of the respective membrane blocks (1) of the membrane separation stage are connected to one another by means of conduits (19*a*, 19*b*); and the first feed gas conduit (7) and second feed gas conduit (8) are independently connected at spatially separate sites to a distributor conduit (4) or a branch (5) or to a conduit (19*a*, 19*b*), where the attachment points are arranged such that two or more than two branches (5) and/or two or more than two gas inlets (3) are disposed between the attachment points of the first feed gas conduit (7) and the second feed gas conduit (8).

10. The device according to claim 8, wherein:

the gas distributor in a membrane block (1) comprises connection conduits (18) that each connect the gas inlet (3) of a membrane separation unit (2) to the gas inlet (3) or the gas inlet(s) (3) of the adjacent membrane separation unit(s) (2) in the membrane block (1);

the membrane blocks (1) of the membrane separation stage are connected to one another by means of conduits (20*a*, 20*b*), where the conduits (20*a*, 20*b*) in the respective membrane block (1) are each connected to one or more connection conduit(s) (18) and/or one or more gas inlet(s) (3), where a pipe conduit (20*a*) in the respective membrane block (1) is connected to a connection conduit (18) or a gas inlet (3) and the pipe conduit (20*b*) in the respective membrane block is connected to a different connection conduit (18) or a different gas inlet (3); and the first feed gas conduit (7) and the second feed gas conduit (8) are independently connected at spatially separate sites to one or more connection conduit(s) (18) or to one or more conduit(s) (20*a*, 20*b*), or to one or more gas inlet(s) (3), where the attachment points are arranged such that two, or more gas inlets (3) are disposed between the attachment points of the first feed gas conduit (7) and the second feed gas conduit (8).

11. The device of claim 1, wherein, for one or more distributor conduit(s) (4) and/or one or more connection conduit(s) (18) and/or one or more conduit(s) (19*a*, 19*b*, 20*a*, 20*b*), at potential contact sites of the feed gas streams that meet in the conduit, measures are taken to control mixing and/or substantially prevent full mixing of feed gas streams, said measures being selected from the group consisting of: reducing conduit cross sections, extending conduit sections, introducing static mixers, inserting pigs in the gas conduits, and combinations thereof.

12. The device of claim 1, wherein:

the retentate gas conduits (9), of the membrane separation units (2) of a membrane block (1) of the membrane separation stage are connected to a retentate gas collection pipe (11), where the retentate gas collection pipe (11) is connected to at least one first retentate gas discharge conduit (12); and/or the permeate gas conduits (10) of the membrane separation units (2) of a membrane block (1) of the membrane separation stage are supplied to a permeate gas collection pipe (14), wherein the permeate gas collection pipe is connected to at least one first permeate gas discharge conduit (15).

13. The device of claim 1, wherein:

the device comprises retentate connection conduits (32) between the retentate gas outlets (30) of the membrane separation units (2) of a membrane block (1) of the membrane separation stage, wherein at least one retentate connection conduit (32) or at least one retentate gas outlet (30) is additionally connected to at least one retentate gas discharge conduit (12), where one or more retentate connection conduit(s) (32) and/or one or more retentate gas outlet(s) (30) in one membrane block (1) of the membrane separation stage are each independently connected to a retentate gas discharge conduit (12) or (13), and/or the device comprises permeate connection conduits (33) between the permeate gas outlets (31) of the membrane separation units (2) of a membrane block (1) of the membrane separation stage, where at least one permeate connection conduit (33) or at least one permeate gas outlet (31) is additionally connected to at least one permeate gas discharge conduit (15), where one or more permeate connection conduit(s) (33) and/or one or more permeate gas outlet(s) (31) in one membrane block (1) of the membrane separation stage are each independently connected to a permeate gas discharge conduit (15) or (16).

14. The device of claim 1, wherein:

the device comprises two membrane separation stages A and B, wherein a first feed gas conduit (7) and a second feed gas conduit (8) are connected to the gas distributor of the first membrane separation stage A, and the first membrane separation stage A is configured such that two different retentate streams are obtained in a first retentate gas discharge conduit (12) and a second retentate gas discharge conduit (13) and/or two different permeate streams are obtained in a first permeate gas discharge conduit (15) and a second permeate gas discharge conduit (16); and the first retentate gas discharge conduit (12) and the second retentate gas discharge conduit (13) or the first permeate gas discharge conduit (15) and the second permeate gas discharge conduit (16) are connected to the gas distributor of the second membrane separation stage B.

15. The device of claim 1, wherein the device comprises three membrane separation stages A, B and C wherein:

first feed gas conduit (7) and a second feed gas conduit (8) are connected to the gas distributor of the first membrane separation stage A and the first membrane separation stage A is configured such that two different retentate streams are obtained in a first retentate gas discharge conduit (12) and a second retentate gas discharge conduit (13) and/or two different permeate streams are obtained in a first permeate gas discharge conduit (15) and a second permeate gas discharge conduit (16);

the first retentate gas discharge conduit (12) and the second retentate gas discharge conduit (13) are connected to the gas distributor of the second membrane separation stage B; and the first permeate gas discharge conduit (15) and the second permeate gas discharge conduit (16) are connected to the gas distributor of the third membrane separation stage C.

16. A method of simultaneously purifying two or more gas streams of different composition, wherein the separation of the gases is conducted in the device of claim 1.

17. The method of claim 16, comprising:

i) providing a first feed gas stream;

ii) providing a second feed gas stream of different composition from the first feed gas stream;

iii) feeding the first and second feed gas streams to a membrane separation stage, wherein:

the membrane separation stage has one membrane separation block (1) or multiple membrane blocks (1), and the membrane separation block(s) (1) each comprise(s) multiple membrane separation units (2) connected in parallel;

the membrane separation stage has a gas distributor comprising connection conduits (18) that connect the gas inlets (3) of two adjacent membrane separation units (2) of a membrane block (1) to one another and/or distributor conduits (4) containing multiple branches (5) that are each connected by means of separate supply conduits (6) to the gas inlets (3) of the individual membrane separation units (2) of a membrane block (1), wherein one or more branch(es) (5) may additionally also have an attachment means for a feed gas conduit, such that, by means of the branch(es) (5), a feed gas conduit and a supply conduit (6) may simultaneously be connected to the distributor conduit (4);

the membrane separation stage, if it comprises multiple membrane blocks (1), comprises conduits (19*a*, 19*b*, 20*a*, 20*b*), that connect the membrane blocks (1) of the membrane separation stage to one another;

where the first and second feed gas streams are each independently supplied at spatially separate sites to a distributor conduit (4) or a connection conduit (18) or a branch (5) or, if present, a conduit that connects the membrane blocks (1) of the membrane separation stage to one another (19*a*, 19*b*, 20*a*, 20*b*), or a gas inlet (3), where the attachment points of the first and second feed gas streams are arranged such that two, or more than two, branches (5) and/or two, or more than two, gas inlets (3) are disposed between the attachment points;

iv) supplying the first and second feed gas streams by means of the gas distributor to the gas inlets (3) of the membrane separation units (2) of the membrane separation stage;

v) separating the gas mixtures supplied via the gas inlets (3) to the membrane separation units (2) by means of gas separation membranes in the membrane separation units (2), in each case into a retentate gas stream and a permeate gas stream.

18. The method of claim 17, wherein:

the first and second feed gas streams are supplied by means of a gas distributor to the gas inlets (3) of the membrane separation units (2) of the first membrane separation stage in such a way that the first feed gas stream and the second feed gas stream flow towards each other within one membrane block (1) or multiple membrane blocks (1) of the membrane separation stage, in one or more distributor conduit(s) (4) and/or one or more connection conduit(s) (18), and/or within the conduit(s) that connect the membrane blocks (1) of the membrane separation stage to one another, (19*a*, 19*b*, 20*a*, 20*b*); and/or at least two different membrane separation units (2) in at least one membrane block (1) of the membrane separation stage are each supplied with gas streams of different composition.

19. The method of claim 17, further comprising the steps of:

vi) combining retentate gas streams from the membrane separation units (2) of a membrane block (1) to give one or more retentate gas stream(s); and/or vii) combining permeate streams from the membrane separation units (2) of a membrane block (1) to give one or more permeate gas stream(s).

20. The method of claim 19, wherein:

the retentate streams from the membrane separation units (2) of a membrane block (1) of the membrane separation stage are supplied to a retentate gas collection pipe (11), where they are either combined to form one retentate gas stream and supplied to a retentate gas discharge conduit (12), or are divided into at least two retentate gas streams 1 and 2 and supplied to at least two retentate gas discharge conduits (12) and (13); and/or the permeate streams from the membrane separation units (2) of a membrane block (1) of the membrane separation stage are supplied to a permeate gas collection pipe (14), where they are either combined to form one permeate gas stream and supplied to a permeate gas discharge conduit (15), or where they are divided into at least two permeate gas streams 1 and 2 and supplied to at least two permeate gas discharge conduits (15) and (16).

* * * * *